United States Patent
Lee et al.

(10) Patent No.: US 12,509,458 B2
(45) Date of Patent: Dec. 30, 2025

(54) [$^{18}$F]-LABELED IMIDAZOPYRIDINE DERIVATIVES AS PET RADIOTRACER

(71) Applicant: 1ST Biotherapeutics, Inc., Gyeonggi-do (KR)

(72) Inventors: Jinhwa Lee, Gyeonggi-do (KR); Hwajung Nam, Busan (KR)

(73) Assignee: 1ST Biotherapeutics, Inc., Gyeonggi-do (KR)

( * ) Notice: Subject to any disclaimer, the term of this patent is extended or adjusted under 35 U.S.C. 154(b) by 461 days.

(21) Appl. No.: 18/022,192

(22) PCT Filed: Aug. 20, 2021

(86) PCT No.: PCT/IB2021/057680
§ 371 (c)(1),
(2) Date: Feb. 20, 2023

(87) PCT Pub. No.: WO2022/038572
PCT Pub. Date: Feb. 24, 2022

(65) Prior Publication Data
US 2023/0339940 A1 Oct. 26, 2023

Related U.S. Application Data

(60) Provisional application No. 63/068,476, filed on Aug. 21, 2020.

(51) Int. Cl.
*A61K 101/02* (2006.01)
*A61B 6/03* (2006.01)
*A61K 51/04* (2006.01)
*C07D 471/04* (2006.01)
*C12Q 1/48* (2006.01)
*G01N 33/50* (2006.01)

(52) U.S. Cl.
CPC ............ *C07D 471/04* (2013.01); *A61B 6/037* (2013.01); *A61K 51/0455* (2013.01); *C12Q 1/485* (2013.01); *G01N 33/5088* (2013.01); *C07B 2200/05* (2013.01); *G01N 2333/912* (2013.01)

(58) Field of Classification Search
None
See application file for complete search history.

(56) References Cited

U.S. PATENT DOCUMENTS 10,669,246 B2  6/2020  Lee et al.
2011/0178070 A1  7/2011  Gong et al.

FOREIGN PATENT DOCUMENTS

| WO | WO-2009/026254 A1 | 2/2009 |
| WO | WO-2011/045415 A2 | 4/2011 |
| WO | 2013-090497 A1 | 6/2013 |
| WO | WO-2015/134171 A1 | 9/2015 |
| WO | 2020/170205 A1 | 8/2020 |
| WO | 2020-178795 A1 | 9/2020 |

OTHER PUBLICATIONS

Neurodegneraetive Diseases MeSH listing from www.ncbi.nlm.nih.gov, accessed Aug. 13, 2025 (Year: 2025).*
"Neurodegenerative Diseases" from https://my.clevelandclinic.org/, last reviewed May 10, 2023 (Year: 2023).*
International Search Report from corresponding PCT Application No. Nov. 24, 2021.

* cited by examiner

*Primary Examiner* — Nissa M Westerberg
(74) *Attorney, Agent, or Firm* — Harness, Dickey & Pierce, P.L.C.

(57) ABSTRACT

The present disclosure relates to [$^{18}$F]-labeled imidazopyridine derivatives or salts thereof as positron emission tomography (PET) radiotracers suitable for imaging the stress-signaling non-receptor tyrosine kinase c-abl, and their use in in vivo diagnosis, preclinical and clinical imaging, patient stratification on the basis of mutational status of c-abl and assessing response to therapeutic treatments. The present disclosure further relates to the use of [$^{18}$F]-labeled imidazopyridine derivatives as PET radiotracers. The disclosure also provides a process for the radiosynthesis of [$^{18}$F]-labeled imidazopyridinederivatives.

11 Claims, 18 Drawing Sheets

[¹⁸F]-LABELED IMIDAZOPYRIDINE DERIVATIVES AS PET RADIOTRACER

CROSS-REFERENCE TO RELATED APPLICATION

This application is a national phase entry of PCT Application No. PCT/IB2021/057680, filed on 20 Aug. 2021, which claims priority to U.S. Patent Application No. 63/068,476, filed on 21 Aug. 2020. The entire disclosure of the application identified in this paragraph is incorporated herein by reference.

FIELD

The present disclosure generally relates to fluorine-18 labeled imidazopyridine compounds as positron emission tomography (PET) tracers for imaging enzyme inhibitory activity comprising the compound and methods of using the compounds for diagnosis and imaging.

BACKGROUND

Positron emission tomography (PET) is a nuclear imaging methodology that detects pairs of gamma rays emitted indirectly by a positron-producing radionuclide. Radiotracers are used in PET as diagnostic tools and to image tissue concentration of molecules of interest.

The development of molecular imaging biomarkers is closely related to the development of therapeutic agents. Among the potential targets, the tyrosine kinase c-abl is tightly regulated non-receptor protein tyrosine kinase involved in a wide range of cellular processes, including growth, survival and stress response (*Nat Rev Mol Cell Biol*, 2004, 5:33-44) and c-abl is involved in regulation of several cellular processes and has implicated in the development of the central nervous system by controlling neurogenesis. More recently, increasing evidence from various experimental model systems has also revealed that c-abl is activated in neurodegenerative disease such as Alzheimer's disease, Parkinson's disease, Niemann-Pick type C diseases and tauopathies. (*Human Molecular Genetics*, 2014, Vol. 23, No. 11)

The stress-signaling non-receptor tyrosine kinase c-abl links parkin to sporadic forms of Parkinson's disease via tyrosine phosphorylation. Tyrosine phosphorylation of parkin by c-abl is a major post-translational modification that leads to loss of parkin function and disease progression in sporadic Parkinson disease. Inhibition of c-abl offers new therapeutic opportunities for blocking Parkinson disease progression. (*The Journal of Neuroscience*, 2011, 31(1):157-163) Amyotrophic lateral sclerosis (ALS) is a fatal neurodegenerative disease characterized by progressive death of motor neurons. Knockdown of c-abl with small interfering RNAs (siRNAs) also rescued ALS motor neuron degeneration. (Imamura et al., *Sci. Transl. Med.* 9, 2017) Multiple System Atrophy (MSA) is a rare, rapidly progressive neurodegenerative disease without any current treatment. In MSA there is accumulation of a-synuclein in the neurons and oligodendrocytes of the substantia nigra, striatum, olivopontocerebellar structures and spinal cord. (*J Neural Trans Vienna Austria* 1996. 2016;123(6))

Administration of the tyrosine kinase inhibitor nilotinib decreases c-abl activity and ameliorates autophagic clearance of α-synuclein in transgenic and lentiviral gene transfer models. Activation of c-abl in the mouse forebrain induces neurodegeneration in the hippocampus and striatum. Therefore, an increase in c-abl activity via phosphorylation may be associated with the α-synuclein pathology detected in Parkinson disease and other neurodegenerative disease. (*Hum Mol Genet*. 2013 Aug. 15).

c-abl is a potential therapeutic target for α-synucleinopathy, Parkinson disease, Alzheimer disease, ALS, Dementia with Lewy body and MSA. Recent studies have revealed a critical role for c-abl in Parkinson's disease (PD), such as induction of alpha-synuclein aggregation through its direct phosphorylation, inactivation of parkin and induction of neuroinflammation. The expression level of total c-abl as well as activated c-abl measured by Y412 and Y214 phosphorylated forms are known to be upregulated in PD pathogenesis in various animal models and more importantly in human specimen such as post-mortem whole brain or striatum samples from PD patients.

However, it has not been explored yet whether the level of c-abl in substantia nigra or striatum in live PD patients is upregulated or not. It would be critical to understand the pathophysiological roles for c-abl in PD and its functional link with disease stages and symptomatic status by investigating c-abl expression level from the brain of PD patients.

The present invention provides a new fluorine-18 radiolabeled compound selective for targeting c-abl as a PET tracer for in vitro and in vivo imaging study.

The $IC_{50}$'s for c-abl catalytic inhibition of each cold compounds, Formula IIA and IIB are in the range of 0.59 nM to 10 nM. We utilize the corresponding cold compounds to synthesize ¹⁸F radiotracers for PET.

SUMMARY

The present disclosure provides a compound having c-abl kinase inhibitory activity, a composition comprising the compound and a method useful to treat a neurodegenerative disease.

In an embodiment, the compound is a compound of Formula (I):

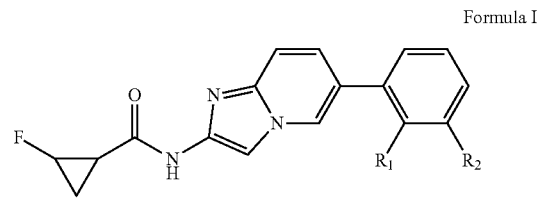

Formula I wherein $R_1$ and $R_2$ are as defined as below.

In another embodiment, the present invention provides an enantiomer, diastereomer or racemate of the compound of Formula (I) or a pharmaceutically acceptable salt thereof.

In yet another embodiment, the present disclosure provides a method of utilizing the compound for visualizing brain abnormalities, cell death and neural injury with the diverse landscape of neurological imaging.

DETAILED DESCRIPTION

Figure 1:
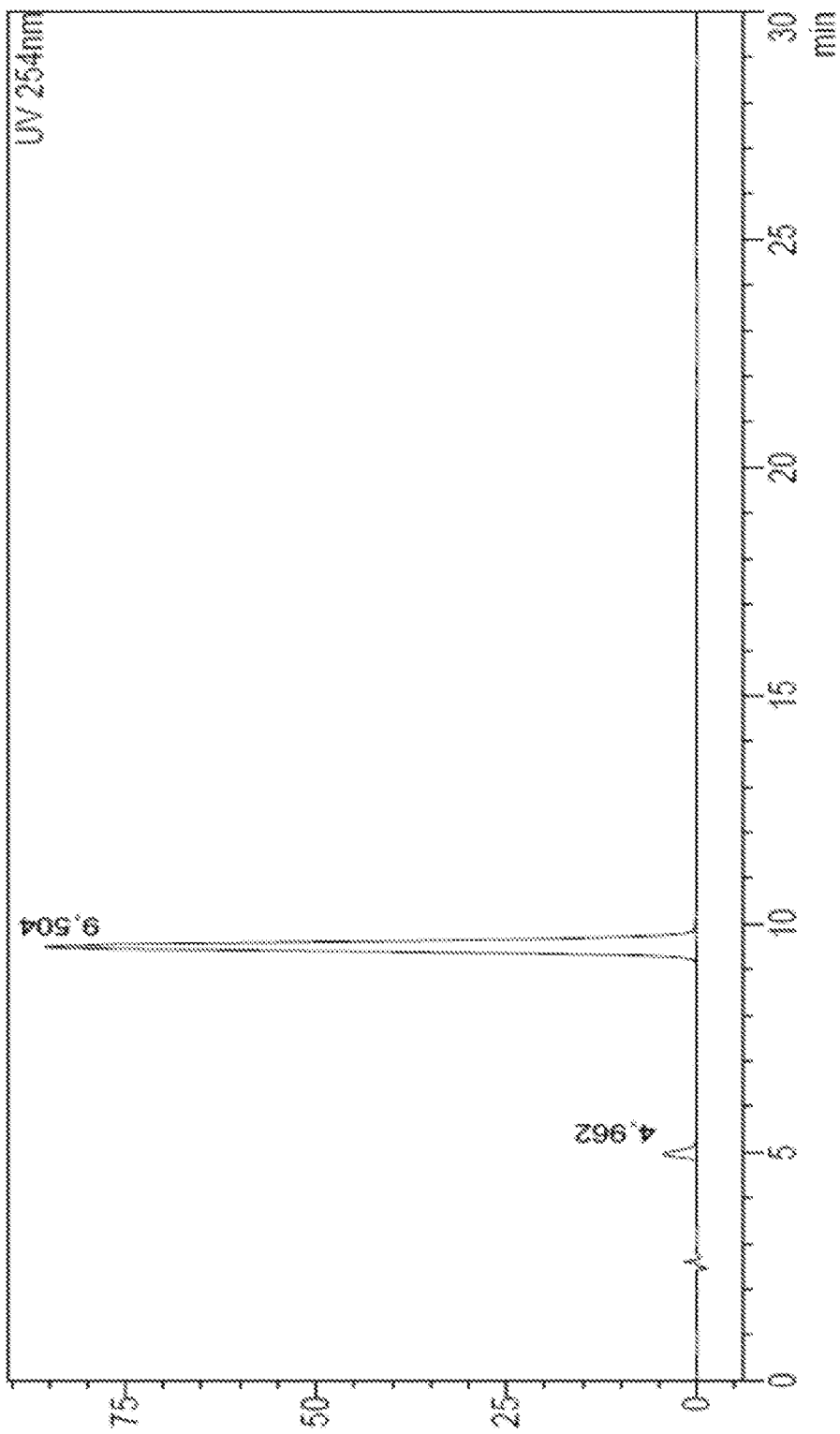
FIG. 1 is HPLC chromatogram of Example 1 (RT=9.504 min), UV at 254 nm using HPLC method 1.

The following description is merely exemplary in nature and is not intended to limit the present disclosure, application, or uses.

Definitions

As used herein, the term "pharmaceutically acceptable" means suitable for use in pharmaceutical preparations, generally considered as safe for such use, officially approved by a regulatory agency of a national or state government for such use, or being listed in the U.S. Pharmacopoeia or other generally recognized pharmacopoeia for use in animals, and more particularly in humans.

As used herein, the term "pharmaceutically acceptable carrier" refers to a diluent, adjuvant, excipient, or carrier, or other ingredient which is pharmaceutically acceptable and with which a compound of the invention is administered.

As used herein, the term "pharmaceutically acceptable salt" refers to a salt which may enhance desired pharmacological activity. Examples of pharmaceutically acceptable salts include acid addition salts formed with inorganic or organic acids, metal salts and amine salts. Examples of acid addition salts formed with inorganic acids include salts with hydrochloric acid, hydrobromic acid, sulfuric acid, nitric acid and phosphoric acid. Examples of acid addition salts formed with organic acids such as acetic acid, propionic acid, hexanoic acid, heptanoic acid, cyclopentanepropionic acid, glycolic acid, pyruvic acid, lactic acid, malonic acid, succinic acid, malic acid, maleic acid, fumaric acid, tartaric acid, citric acid, benzoic acid, o-(4-hydroxy-benzoyl)-benzoic acid, cinnamic acid, mandelic acid, methanesulfonic acid, ethanesulfonic acid, 1,2-ethanedisulfonic acid, 2-hydroxyethane-sulfonic acid, benzenesulfonic acid, p-chlorobenzenesulfonic acid, 2-naphthalenesulfonic acid, p-toluenesulfonic acid, camphorsulfonic acid, 4-methyl-bicyclo [2.2.2]oct-2-ene1-carboxylic acid, gluco-heptonic acid, 4,4'-methylenebis(3-hydroxy-2-naphthoic) acid, 3-phenylpropionic acid, trimethyl-acetic acid, tertiary butylacetic acid, lauryl sulfuric acid, gluconic acid, glutamic acid, hydroxy-naphthoic acids, salicylic acid, stearic acid and muconic acid. Examples of metal salts include salts with sodium, potassium, calcium, magnesium, aluminum, iron, and zinc ions. Examples of amine salts include salts with ammonia and organic nitrogenous bases strong enough to form salts with carboxylic acids.

As used herein, the term "therapeutically effective amount" means when applied to a compound of the invention is intended to denote an amount of the compound that is sufficient to ameliorate, palliate, stabilize, reverse, slow or delay the progression of a disorder or disease state, or of a symptom of the disorder or disease. In an embodiment, the method of the present invention provides for administration of combinations of compounds. In such instances, the "therapeutically effective amount" is the amount of a compound of the present invention in the combination sufficient to cause the intended biological effect.

As used herein, the term "treatment" or "treating" as used herein means ameliorating or reversing the progress or severity of a disease or disorder, or ameliorating or reversing one or more symptoms or side effects of such disease or disorder. "Treatment" or "treating", as used herein, also means to inhibit or block, as in retard, arrest, restrain, impede or obstruct, the progress of a system, condition or state of a disease or disorder. For purposes of this invention, "treatment" or "treating" further means an approach for obtaining beneficial or desired clinical results, where "beneficial or desired clinical results" include, without limitation, alleviation of a symptom, diminishment of the extent of a disorder or disease, stabilized (i.e., not worsening) disease or disorder state, delay or slowing of a disease or disorder state, amelioration or palliation of a disease or disorder state, and remission of a disease or disorder, whether partial or total.

In another embodiment, the compounds of Formula (I) are used for modulating the activity of a protein kinase c-abl.

As used herein, the term "modulating" or "modulation" refers to the alteration of the catalytic activity of a protein kinase. In particular, modulating refers to the activation or inhibition of the catalytic activity of a protein kinase, depending on the concentration of the compound or salt to which the protein kinase is exposed or, more preferably, the inhibition of the catalytic activity of a protein kinase. The term "catalytic activity" as used herein refers to the rate of phosphorylation of tyrosine, serine or threonine under the influence, direct or indirect, of a protein kinase.

The three main classes that pharmacological inhibitors of kinase activity are categorized by are (1) Type I, or "DFG-in" ATP competitive inhibitors, which directly compete with ATP in the ATP binding site (i.e., dual SRrcABL inhibitor dasatinib, (2) Type II, or "DFG-out" ATP competitive inhibitors, which, in addition to binding the ATP binding site also engage an adjacent hydrophobic binding site that is only accessible when the kinase is in an inactivated configuration (i.e., the activation loop is oriented in a conformation that would block substrate binding) (i.e., imatinib, nilotinib), and (3) non-ATP competitive inhibitors that bind at sites outside the ATP binding site that affect the activity of the kinase (i.e., GNF-2).

As used herein, the phrase "compound(s) of this/the disclosure" includes any compound(s) of Formula (I), as well as clathrates, hydrates, solvates, or polymorphs thereof. And, even if the term "compound(s) of the disclosure" does not mention its pharmaceutically acceptable salts, the term includes salts thereof. In one embodiment, the compounds of this disclosure include stereochemically pure compounds, e.g., those substantially free (e.g., greater than 85% ee, greater than 90% ee, greater than 95% ee, greater than 97% ee, or greater than 99% ee) of other stereoisomers. That is, if the compounds of Formula (I) according to the present disclosure or salts thereof are tautomeric isomers and/or stereoisomers (e.g., geometrical isomers and conformational isomers), such isolated isomers and their mixtures also are included in the scope of this disclosure. If the compounds of the present disclosure or salts thereof have an asymmetric carbon in their structures, their active optical isomers and their racemic mixtures also are included in the scope of this disclosure.

As used herein, the term "polymorph" refers to solid crystalline forms of a compound of this disclosure or complex thereof. Different polymorphs of the same compound can exhibit different physical, chemical and/or spectroscopic properties. Different physical properties include, but are not limited to stability (e.g., to heat or light), compressibility and density (important in formulation and product manufacturing), and dissolution rates (which can affect bioavailability). Differences in stability can result from changes in chemical reactivity (e.g., differential oxidation, such that a dosage form discolors more rapidly when comprised of one polymorph than when comprised of another polymorph) or mechanical characteristics (e.g., tablets crumble on storage as a kinetically favored polymorph converts to thermodynamically more stable polymorph) or both (e.g., tablets of one polymorph are more susceptible to breakdown at high humidity). Different physical properties of polymorphs can affect their processing. For example, one polymorph might be more likely to form solvates or might be more difficult to filter or wash free of impurities than another due to, for example, the shape or size distribution of particles of it.

As used herein, the term "solvate" means a compound or its salt according to this disclosure that further includes a stoichiometric or non-stoichiometric amount of a solvent bound by non-covalent intermolecular forces. Preferred solvents are volatile, non-toxic, and/or acceptable for administration to humans in trace amounts.

As used herein, the term "hydrate" means a compound or its salt according to this disclosure that further includes a stoichiometric or non-stoichiometric amount of water bound by non-covalent intermolecular forces.

As used herein, the term "clathrate" means a compound or its salt in the form of a crystal lattice that contains spaces (e.g., channels) that have a guest molecule (e.g., a solvent or water) trapped within.

Compounds of the Present Disclosure

The present disclosure provides compounds according to Formula (I):

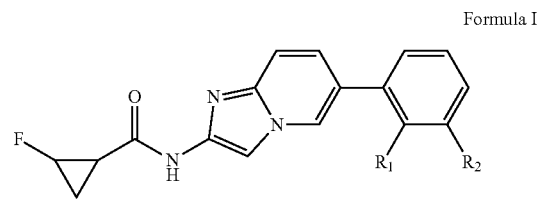

Formula I or a pharmaceutically acceptable salt thereof, wherein $R_1$ is —$CH_2CH_2{}^{18}F$ or —$OCH_2CH_2{}^{18}F$ when $R_2$ is —H, or $R_1$ is —$CH_2CH_2{}^{18}F$ or —$OCH_2CH_2{}^{18}F$ when $R_2$ is —F.

In one embodiment, the compound of Formula (I) is selected from the compound according to Formula (IIA) and pharmaceutically acceptable salts thereof:

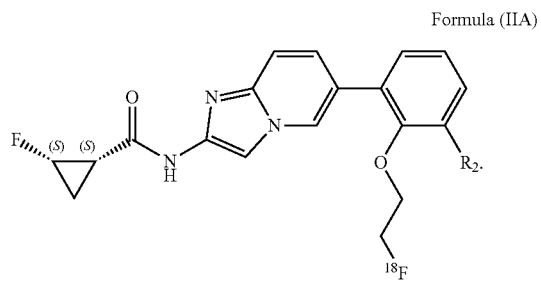

Formula (IIA)

wherein $R_2$ is —H or —F.

In one embodiment, the compound of Formula (I) is selected from the compound according to Formula (IIB) and pharmaceutically acceptable salts thereof:

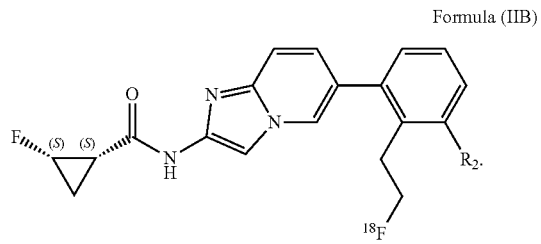

Formula (IIB)

wherein $R_2$ is —H or —F.

In yet another embodiment, there is provided a pharmaceutical composition comprising a therapeutically effective amount of a compound of Formula (I) or a pharmaceutically acceptable salt thereof, and a pharmaceutically acceptable carrier.

In another embodiment, there is provided a method for treating a neurodegenerative disease or disorder comprising administering to a subject in need thereof a therapeutically effective amount of a compound of Formula (I) or pharmaceutically acceptable salt thereof. That is, there is provided a medical use of the compound of Formula (I) or pharmaceutically acceptable salt thereof, wherein Formula (I) or pharmaceutically acceptable salt thereof is used as an active agent. In some embodiments, the neurodegenerative disease is selected from the group consisting of α-synucleinopathy, Parkinson's disease, dementia with Lewy body, multiple system atrophy (MSA), Alzheimer's disease, and amyotrophic lateral sclerosis (ALS).

In one embodiment, the present disclosure relates to fluorine-18 labeled imidazopyridine compounds as positron emission tomography (PET) tracers for imaging enzyme inhibitory activity comprising the compound and methods of using the compounds for diagnosis and imaging. In an embodiment, there is provided a method for treating a neurodegenerative disease comprising: administering to a subject in need thereof a therapeutically effective amount of the compound above or a pharmaceutically acceptable salt thereof.

In another embodiment, there is provided a method of determining an enzyme inhibitory activity, the method comprising: applying the compound above to a biological sample, and imaging the compound to determine the enzyme inhibitory activity. In various embodiments, the compound is used as a positron emission tomography (PET) tracer. The method can be a PET imaging method. Also, the method can be used in an AD-induced mouse AD model or an alpha-synuclein PFF-induced mouse PD model. The method can be used to determine c-abl upregulation or activation in a brain. In some embodiments, the method is for companion diagnosis for c-abl therapy or other disease-modifying agents as a predictive biomarker. The method can be used for a patient with a neurodegenerative disease.

EXAMPLES

Hereinafter, the present disclosure is described in considerable detail with examples to help those skilled in the art understand the present disclosure. However, the following examples are offered by way of illustration and are not intended to limit the scope of the invention. It is apparent that various changes may be made without departing from the spirit and scope of the invention or sacrificing all of its material advantages.

Synthesis of Formula (OA) Compound

Example compound of the present disclosure is described in Scheme1.

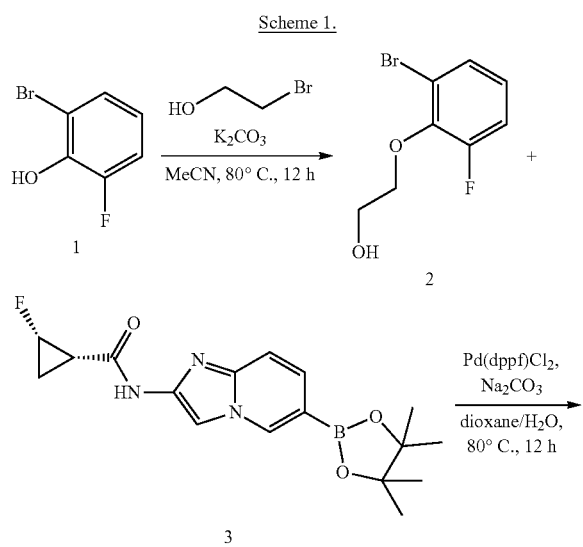

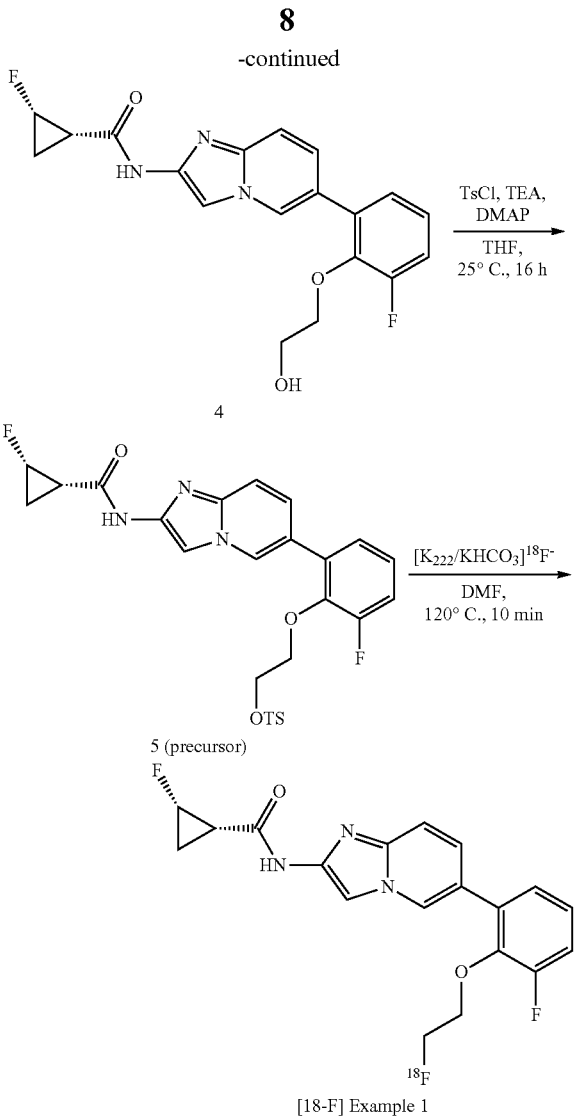

Example 1. (1S,2S)-2-fluoro-N-(6-(3-fluoro-2-(2-(fluoro-$^{18}$F)ethoxy) phenyl)imidazo[1,2-a]pyridin-2-yl)cyclopropane-1-carboxamide Step1) 2-(2-bromo-6-fluorophenoxy)ethan-1-ol To a solution of Compound 1 (5 g, 26.18 mmol, 1 eq), 2-bromoethanol (6.54 g, 52.36 mmol, 3.72 mL, 2 eq) in MeCN (50 mL) was added $K_2CO_3$ (7.60 g, 54.97 mmol, 2.1 eq). The mixture was stirred at 80° C. for 12 hr. The reaction mixture was filtered and concentrated under reduced pressure to give a residue. The residue was purified by silica gel chromatography ($SiO_2$, petroleum ether:ethyl acetate=1:0 to 10:1). Compound 2 (6.0 g, 25.53 mmol, 97.51% yield) was obtained as a yellow oil.
$^1$H NMR (400 MHz, DMSO-$d_6$) δ 7.46 (td, J=1.5, 8.1 Hz, 1H), 7.33 (ddd, J=1.4, 8.4, 11.0 Hz, 1H), 7.10 (dt, J=5.5, 8.3 Hz, 1H), 4.83-4.60 (m, 2H), 4.39-4.24 (m, 2H); LCMS (electrospray) m/z 236.05 (M+H)+.

Step 2) (1 S,2S)-2-fluoro-N-(6-(3-fluoro-2-(2-hydroxyethoxy)phenyl) imidazo[1,2-a]pyridin-2-yl) cyclopropane-1-carboxamide To a solution of Compound 2 (1 g, 4.25 mmol, 1 eq) and Compound 3 (1.76 g, 5.11 mmol, 1.2 eq) in dioxane (0.4 mL) and H₂O (0.1 mL) was added Na₂CO₃ (901.84 mg, 8.51 mmol, 2 eq) and Pd(dppf)Cl₂ (155.65 mg, 212.72 μmol, 0.05 eq) under N₂ atmosphere. The mixture was stirred at 80° C. for 12 hr under N₂ atmosphere. The reaction mixture was diluted with water 200 mL and extracted with ethyl acetate (200 mL*2). The combined organic layers were washed with brine 100 mL, dried over Na₂SO₄, filtered and concentrated under reduced pressure to give a residue. The residue was purified by silica gel chromatography (SiO₂, petroleum ether:ethyl acetate=1:0 to 0:1). Compound 4 (770 mg, 2.06 mmol, 48.48% yield) was obtained as a yellow solid.

¹H NMR (400 MHz, DMSO-d₆) δ 11.03 (s, 1H), 8.83 (s, 1H), 8.09 (s, 1H), 7.51-7.41 (m, 2H), 7.35-7.26 (m, 2H), 7.25-7.16 (m, 1H), 5.06-4.84 (m, 1H), 4.82-4.73 (m, 1H), 3.93 (t, J=4.9 Hz, 2H), 3.55 (q, J=4.4 Hz, 2H), 2.21-2.08 (m, 1H), 1.74-1.58 (m, 1H), 1.21-1.07 (m, 1H); LCMS (electrospray) m/z 374.35 (M+H)+.

Step 3) 2-(2-fluoro-6-(2-((1S,2S)-2-fluorocyclopropane-1-carboxamido) imidazo[1,2-a]pyridin-6-yl) phenoxy)ethyl 4-methylbenzenesulfonate To a solution of Compound 4 (690 mg, 1.85 mmol, 1 eq) in THF (20 mL) was added TEA (467.52 mg, 4.62 mmol, 643.09 μL, 2.5 eq), DMAP (22.58 mg, 184.81 μmol, 0.1 eq) and TsCl (704.68 mg, 3.70 mmol, 2 eq). The mixture was stirred at 25° C. for 12 hr under N₂ atmosphere. The reaction mixture was concentrated under reduced pressure, diluted with water 200 mL and extracted with ethyl acetate (200 mL*2). The combined organic layers were washed with brine 100 mL, dried over Na₂SO₄, filtered and concentrated under reduced pressure to give a residue. The residue was purified by silica gel chromatography (SiO₂, petroleum ether:ethyl acetate=1:0 to 85:15). Compound 5 (470 mg, 890.93 μmol, 48.21% yield) was obtained as a yellow solid.

¹H NMR (400 MHz, DMSO-d₆) δ 11.06 (s, 1H), 8.65 (d, J=0.6 Hz, 1H), 8.11 (s, 1H), 7.59 (d, J=8.3 Hz, 2H), 7.43-7.38 (m, 1H), 7.36-7.28 (m, 4H), 7.28-7.19 (m, 2H), 5.06-4.82 (m, 1H), 4.16-4.05 (m, 4H), 2.37 (s, 3H), 2.21-2.12 (m, 1H), 1.74-1.62 (m, 1H), 1.22-1.13 (m, 1H); LCMS (electrospray) m/z 528.54 (M+H)+.

Step 4) (1S,2S)-2-fluoro-N-(6-(3-fluoro-2-(2-(fluoro-¹⁸F)ethoxy)phenyl) imidazo[1,2-a]pyridin-2-yl)cyclopropane-1-carboxamide

[¹⁸F]Fluoride was produced by the ¹⁸O(p,n)¹⁸F nuclear reaction in an IBA Cyclone® 18/9 cyclotron using a [¹⁸O] H₂O liquid target. After irradiation, the target water was passed through a Chromafix 45 mg PS-HCO₃- ¹⁸F separation cartridge. The trapped [¹⁸F]fluoride was eluted with an aq. K₂SO₄ solution (500 μL, 0.1 M) into a vial containing DMF (850 μL). A solution of N,N-bis(trifluoromethylsulfonyl)aniline (150 μL, 0.1 M) in DMF was added and the temperature was set to 40° C. The formed [18F]triflyl fluoride was distilled over a drying column (P₂O₅) into a vial containing DCB (850 μL) and a K₂₂₂/K₂CO₃ solution (12 μmol K₂₂₂ and 12 μmol K₂CO₃ in 100 μL MeCN) to obtain free [¹⁸F]fluoride. The distillate receiving vial was cooled to −5° C. to efficiently trap the [¹⁸F]triflyl fluoride during the distillation. The distillation was finished after approximately 5 min. Afterward, the precursor, Compound 5 (0.5 mg) in DCB (50 μL) was added. The mixture was heated at 120° C. for 10 min and then cooled before it was diluted with pentane (1.5 ml). The diluted mixture was rinsed through a silica cartridge (Sep-Pak silica light cartridge, Waters) to remove the DCB and trap unreacted [¹⁸F]F⁻. The product was eluted with MeCN (1 ml) and diluted with water (1 ml) prior to purification by semi-preparative HPLC on an Altima C18 5 μm column using isocratic 40% MeCN in water with 0.1% TFA and flow rate 4 ml/min for 30 min. With these conditions, [¹⁸F] Example 1 was isolated in a RCY (d.c.) of 3.4%±1.0% (n=3) and a A_m of 99±35 GBq/μmol (n=3). The isolated fraction of Example 1 was diluted with water (50 ml) and the product was trapped on a tC18 cartridge (Sep-Pak tC18 plus short cartridge, Waters). The EtOH was removed by a stream of He (15 ml/min) under vacuum at 80° C. for 10 min. The residual was cooled before it was reformulated in an appropriate volume of EtOH/saline for animal studies. Total synthesis time including radiolabeling, purification, isolation and reformulation was 59-65 min.

¹H NMR (400 MHz, DMSO-d₆) δ 11.04 (s, 1H), 8.73 (s, 1H), 8.10 (s, 1H), 7.53-7.20 (m, 5H), 5.13-4.77 (m, 1H), 4.60-4.44 (m, 2H), 4.20-4.07 (m, 2H), 2.21-2.10 (m, 1H), 1.75-1.57 (m, 1H), 1.16 (tdd, J=6.0, 9.1, 12.2 Hz, 1H).; LCMS (electrospray) m/z 375.35 (M+H)+.

Example 2. (1S,2S)-2-fluoro-N-(6-(2-(2-(fluoro-¹⁸F) ethoxy)phenyl) imidazo[1,2-a]pyridin-2-yl)cyclopropane-1-carboxamide Synthetic Method is Same as Example 1

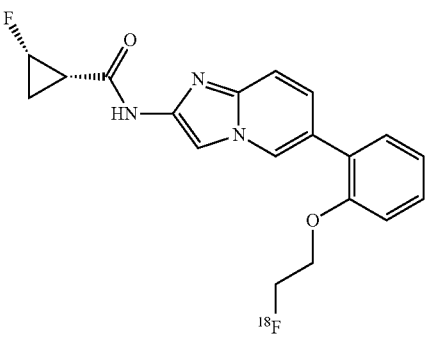 [SMILES: O=C(Nc1cn2cc(-c3ccccc3OCC[18F])ccc2n1)[C@@H]1C[C@@H]1F]

¹H NMR (400 MHz, DMSO-d₆) δ 11.02 (s, 1H), 8.67 (t, J=1.4 Hz, 1H), 8.07 (s, 1H), 7.44-7.35 (m, 4H), 7.16 (d, J=8.0 Hz, 1H), 7.10-7.06 (m, 1H), 5.01-4.82 (m, 1H), 4.72 (dt, J=47.8, 3.8 Hz, 2H), 4.29 (dt, J=29.7, 3.8 Hz, 2H), 2.15-2.12 (m, 1H), 1.68-1.62 (m, 1H), 1.18-1.13 (m, 1H).; LCMS (electrospray) m/z 357.36 (M+H)+.

Synthesis of Formula (IB) Compound

Example compound of the present disclosure is described in Scheme2.

Scheme 2.

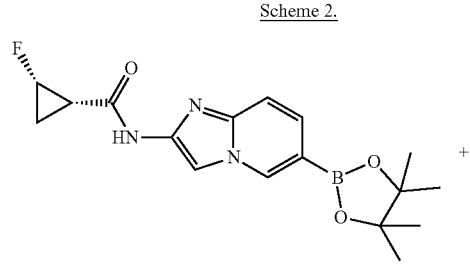

3

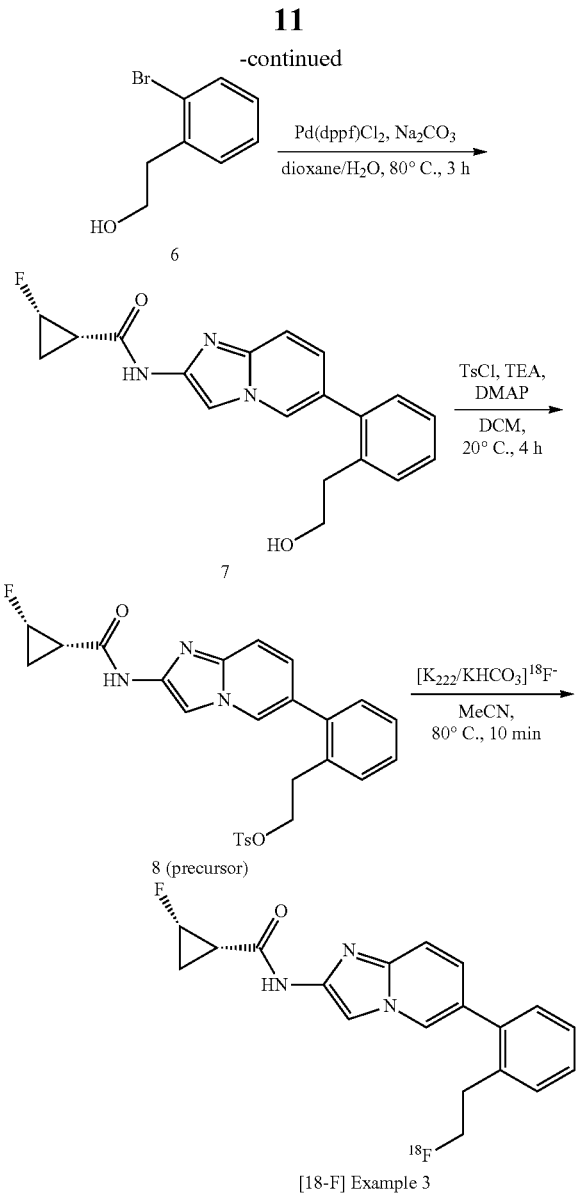

[18-F] Example 3

Example 3. (1S,2S)-2-fluoro-N-(6-(2-(2-(fluoro-$^{18}$F) ethyl)phenyl) imidazo[1,2-a]pyridin-2-yl)cyclopropane-1-carboxamide Step1) (1S,2S)-2-fluoro-N-(6-(2-(2-hydroxyethyl)phenyl)imidazo[1,2-a]pyridin-2-yl)cyclopropane-1-carboxamide To a solution of Compound 6 (2.54 g, 7.36 mmol, 1 eq) and Compound 3 (1.48 g, 7.36 mmol, 1 eq) in dioxane (4 mL) and H$_2$O (16 mL) was added Na$_2$CO$_3$ (1.56 g, 14.7 mmol, 2 eq) and Pd(dppf)Cl$_2$ (538 mg, 0.74 mmol, 0.1 eq) under N$_2$ atmosphere. The mixture was stirred at 80° C. for 12 hr under N$_2$ atmosphere. The reaction mixture was filtered and diluted with water (20 mL), and then extracted by ethyl acetate (40 mL*3), the combined organic layers were dried over Na$_2$SO$_4$, filtered and concentrated under reduced pressure to give a residue. The residue was purified by silica gel chromatography (SiO$_2$, petroleum ether:ethyl acetate=1:4) to give Compound 7 (990 mg, 2.92 mmol, 39.6% yield) as a brown solid.

$^1$H NMR (400 MHz, DMSO-d$_6$) δ 11.02 (s, 1H), 8.53 (s, 1H), 8.10 (s, 1H), 7.46 (d, J=9.17 Hz, 1H), 7.39-7.33 (m, 2H), 7.31-7.24 (m, 2H), 7.21-7.19 (m, 2H), 5.01-4.93 (m, 1H), 4.61 (t, J=5.3 Hz, 1H), 3.52-3.47 (m, 2H), 2.74 (t, J=7.27 Hz, 2H), 2.17-2.13 (m, 1H), 1.70-1.62 (m, 1H), 1.19-1.13 (m, 1H); LCMS (electrospray) m/z 340.10 (M+H)+.

Step 2) 2-(2-((1S,2S)-2-fluorocyclopropane-1-carboxamido)imidazo[1,2-a]pyridin-6-yl)phenethyl 4-methylbenzenesulfonate To a mixture of Compound 7 (940.00 mg, 2.77 mmol, 1 eq) in DCM (80 mL) was added TsCl (3.17 g, 16.62 mmol, 6 eq) and TEA (1.96 g, 19.39 mmol, 2.70 mL, 7 eq) and DMAP (101.52 mg, 830.97 µmol, 0.3 eq) in one portion at 0° C. under N$_2$, then the mixture was stirred at 0° C. for 10 min, then heated to 20° C. and stirred for 4 hours. The reaction mixture was quenched by addition H$_2$O 20 mL at 0° C., and then washed with NaHCO$_3$ (40 mL*2). The organic layers were washed with saturated NaCl solution 40 mL, dried over Na$_2$SO$_4$, filtered and concentrated under reduced pressure to give a residue. The residue was purified by column chromatography (SiO$_2$, petroleum ether/ethyl acetate=4/1 to 1/3). Compound 8 (860 mg, 1.74 mmol, 62.91% yield) was obtained as a white solid.

$^1$H NMR (400 MHz, DMSO-d$_6$) δ 11.08 (s, 1H), 8.42 (s, 1H), 8.08 (s, 1H), 7.53 (d, J=8.3 Hz, 2H), 7.42 (d, J=9.2 Hz, 1H), 7.34-7.32 (m, 3H), 7.27-7.24 (m, 3H), 7.04 (dd, J=1.5, 9.2 Hz, 1H), 5.03-4.85 (m, 1H), 4.09 (t, J=6.8 Hz, 2H), 2.91 (t, J=6.8 Hz, 2H), 2.37 (s, 3H), 2.19-2.16 (m, 1H), 1.72-1.65 (m, 1H), 1.20-1.15 (m, 1H); LCMS (electrospray) m/z 494.10 (M+H)+.

Step 3) (1S,2S)-2-fluoro-N-(6-(2-(2-(fluoro-$^{18}$F)ethyl)phenyl)imidazo[1,2-a]pyridin-2-yl)cyclopropane-1-carboxamide

[$^{18}$F]Fluoride was produced by the $^{18}$O(p,n)$^{18}$F nuclear reaction in an IBA Cyclone® 18/9 cyclotron using a [$^{18}$O] H$_2$O liquid target. After irradiation, the target water was passed through a Chromafix 45 mg PS-HCO$_3$- $^{18}$F separation cartridge. The trapped [$^{18}$F]fluoride was eluted with an aq. K$_2$SO$_4$ solution (500 µL, 0.1 M) into a vial containing DMF (850 µL). A solution of N,N-bis(trifluoromethylsulfonyl)aniline (150 µL, 0.1 M) in DMF was added and the temperature was set to 40° C. The formed [$^{18}$F]triflyl fluoride was distilled over a drying column (P$_2$O$_5$) into a vial containing MeCN (900 µL) with K$_{222}$/K$_2$CO$_3$ solution (12 µmol K$_{222}$ and 12 µmol K$_2$CO$_3$ in 100 µL MeCN) to obtain free [$^{18}$F]fluoride. The distillate receiving vial had a temperature of 20° C. The distillation was finished after approximately 5 min. Afterward, the precursor Compound 8 (1 mg) in MeCN (100 µL) was added. The mixture was heated at 80° C. for 10 min and then cooled before water (1 mL) was added for dilution prior to purification. The diluted mixture was purified by semi-preparative HPLC on a Luna C18 5 µm using 45% MeCN in 20 mM NH$_4$OAc (pH 4). With these conditions, [$^{18}$F] Example 3 was isolated in a RCY(d.c.) of 6.7%±3.5% (n=4) and a A$_m$ of 132±60 GBq/µmol (n=4). The isolated fraction was diluted with water (60 mL) and the product was trapped on a tC18 cartridge (Sep-Pak tC18 plus short cartridge, Waters). The cartridge was washed with water (25 mL) and [$^{18}$F] Example 3 was eluted with EtOH (1 mL). The EtOH was removed by a stream of He (15 mL/min) under vacuum at 80° C. for 10 min. The residual was cooled before it was reformulated in an appropriate volume of EtOH/saline for animal studies. Total synthesis time including radiolabeling, purification, isolation and reformulation was 62-68 min.

$^1$H NMR (400 MHz, DMSO-d$_6$) δ 11.03 (s, 1H), 8.52 (s, 1H), 8.10 (s, 1H), 7.49-7.42 (m, 2H), 7.39 (dt, J=1.7, 7.3 Hz, 1H), 7.36-7.28 (m, 2H), 7.19 (dd, J=1.7, 9.1 Hz, 1H), 5.04-4.80 (m, 1H), 4.63-4.46 (m, 2H), 3.06-2.91 (m, 2H), 2.21-2.08 (m, 1H), 1.74-1.59 (m, 1H), 1.16 (tdd, J=6.2, 9.2, 12.3 Hz, 1H).;LCMS (electrospray) m/z 341.10 (M+H)+.

Example 4. (1S,2S)-2-fluoro-N-(6-(3-fluoro-2-(2-(fluoro-$^{18}$F)ethyl)phenyl) imidazo[1,2-a]pyridin-2-yl)cyclopropane-1-carboxamide Synthetic Method is Same as Example 3

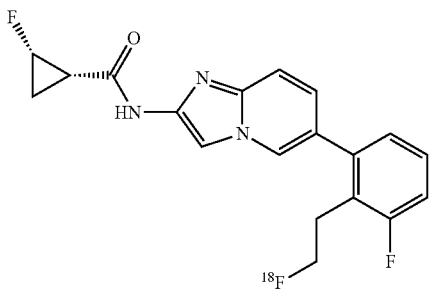 [SMILES: O=C(Nc1cn2cc(-c3cccc(F)c3CC[18F])ccc2n1)[C@@H]1C[C@@H]1F]

$^1$H NMR (400 MHz, DMSO-d$_6$) δ 11.05 (s, 1H), 8.56 (s, 1H), 8.11 (s, 1H), 7.48 (t, J=9.1 Hz, 1H), 7.43-7.24 (m, 2H), 7.22-7.14 (m, 2H), 5.03-4.82 (m, 1H), 4.50 (dt, J=46.9, 6.5 Hz, 2H), 3.02 (dt, J=22.0, 6.3 Hz, 2H), 2.18-2.11 (m, 1H), 1.71-1.60 (m, 1H), 1.20-1.12 (m, 1H).;LCMS (electrospray) m/z 359.35 (M+H)+.

Analytical HPLC Chromatograms

Figure 2:
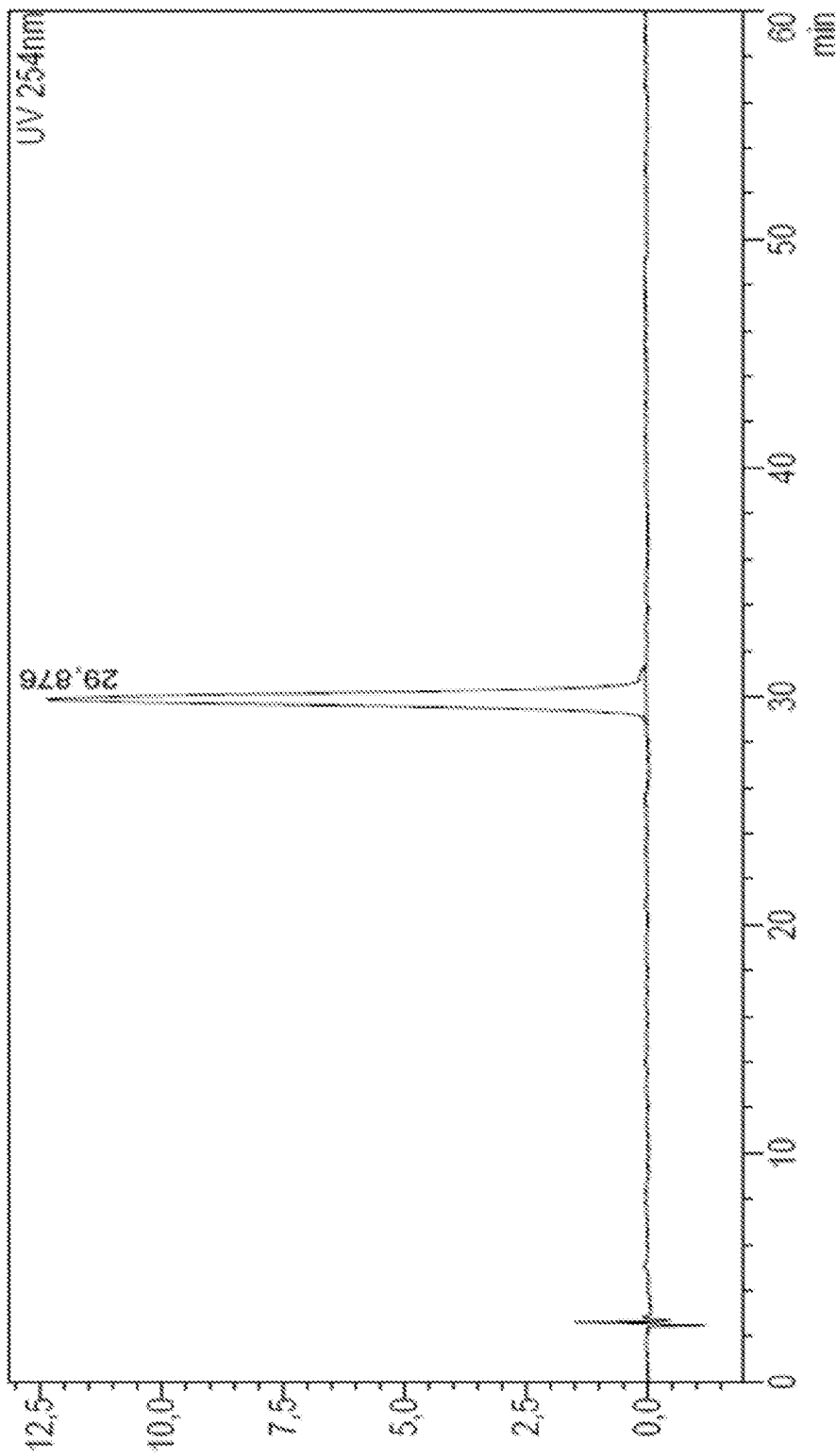
FIG. 2 is HPLC chromatogram of the precursor, Compound 5 (RT=29.876 min), UV at 254 nm using HPLC method 1.
Figure 3:
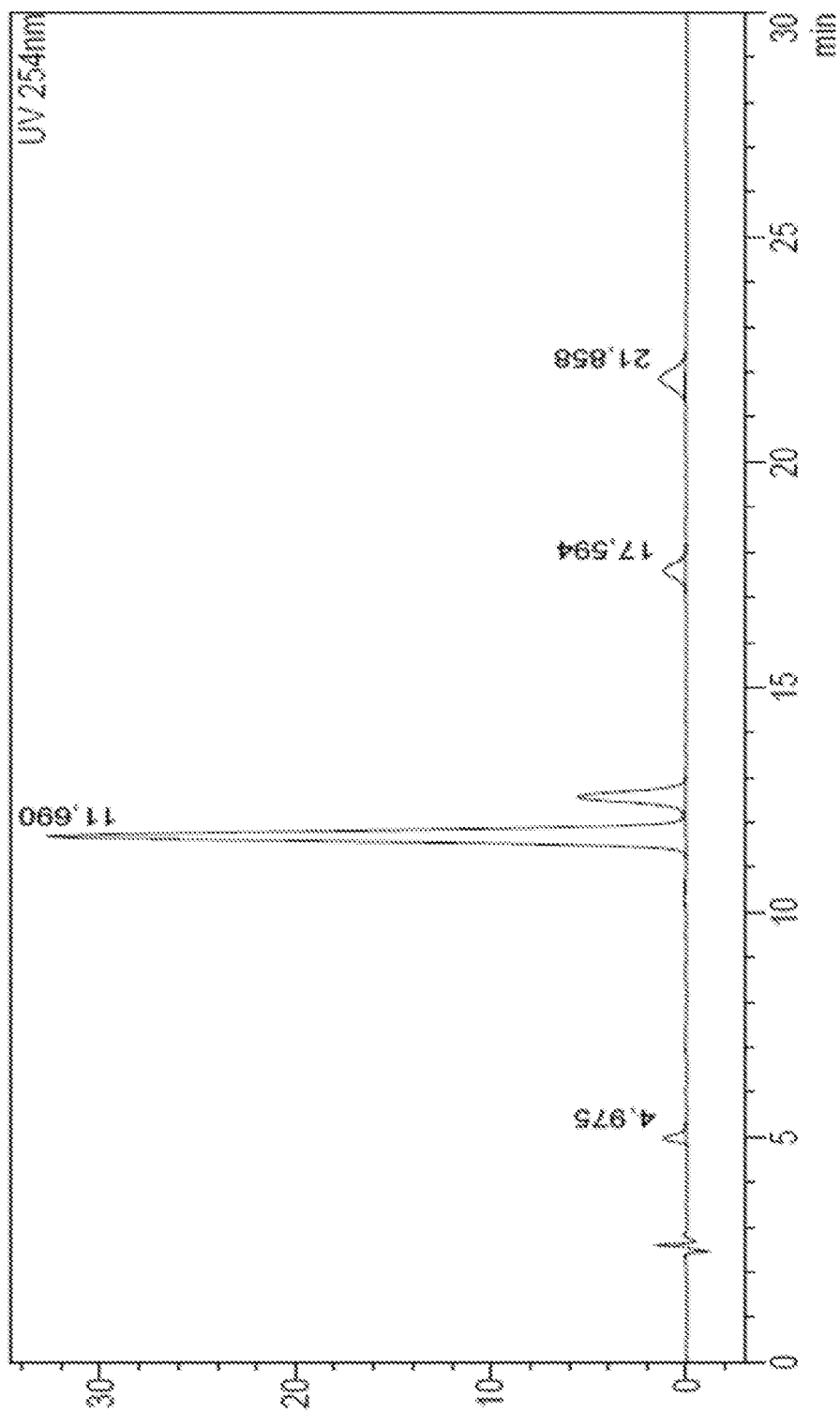
FIG. 3 is HPLC chromatogram of the diastereomer A of Example 1 (RT=11.690 min), UV at 254 nm using HPLC method 1.
Figure 4:
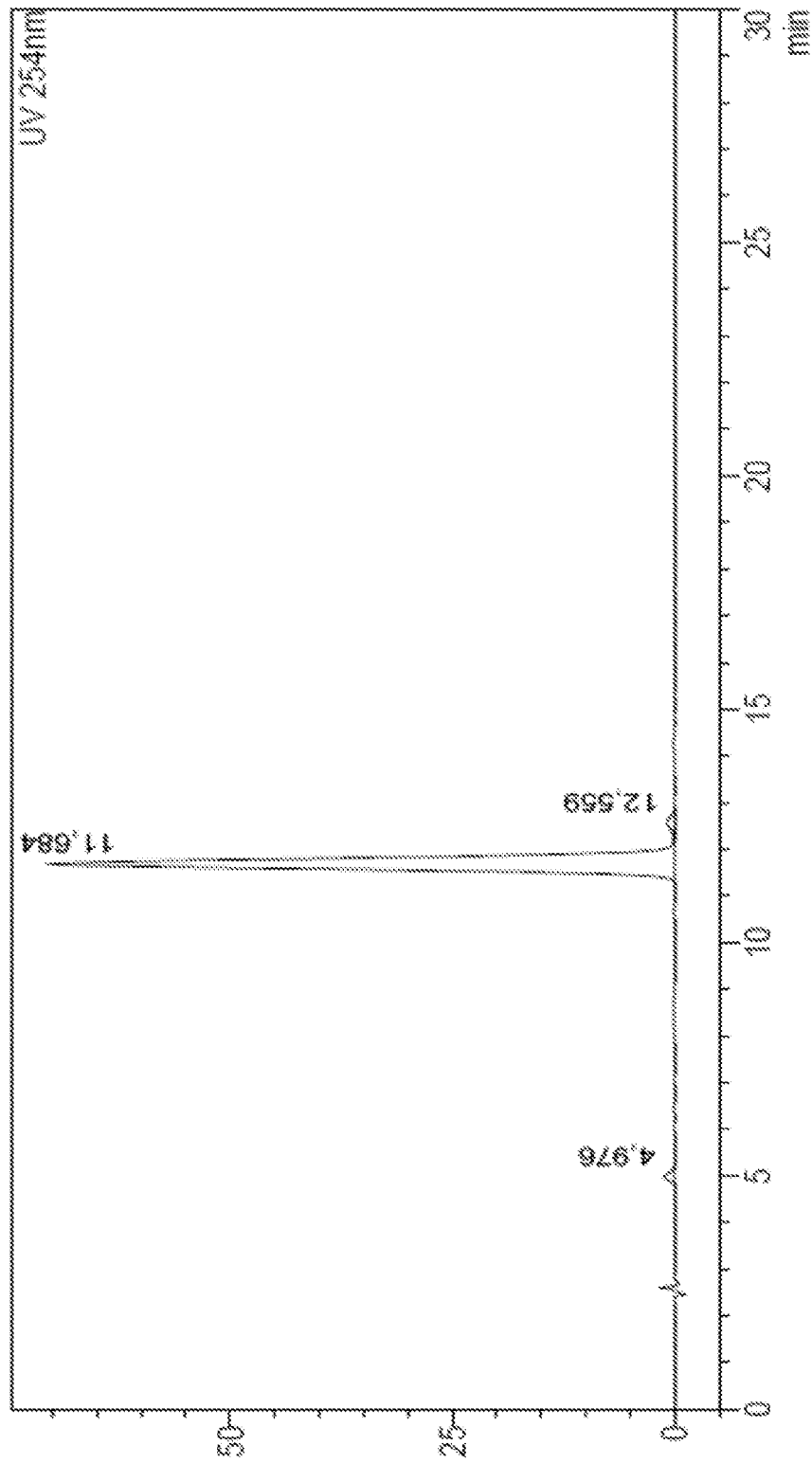
FIG. 4 is HPLC chromatogram of the diastereomer B of Example 1 (RT=11.684 min), UV at 254 nm using HPLC method 1.
Figure 5:
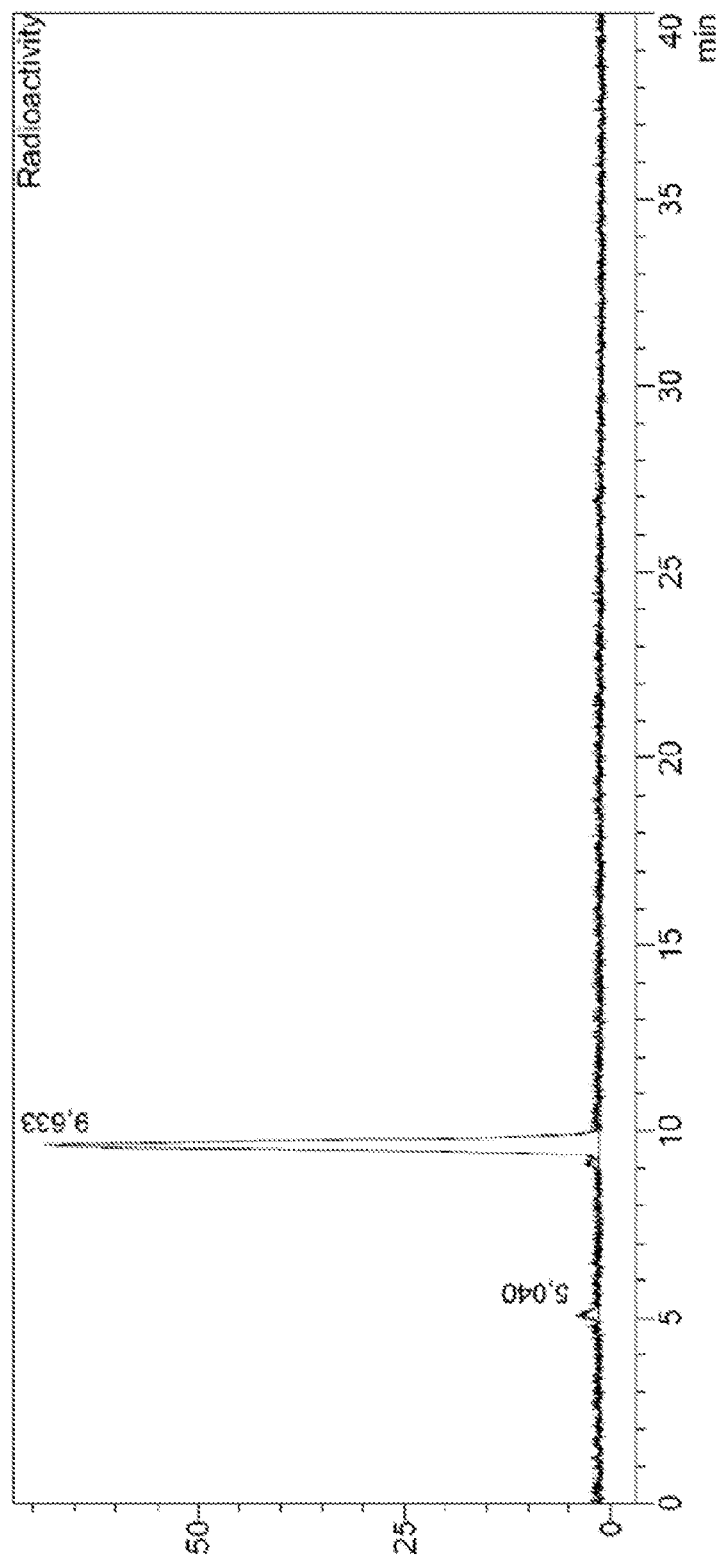
FIG. 5 is HPLC chromatogram of formulated [$^{18}$F] Example 1 (RT=9.633 min), using HPLC method 1.
Figure 6:
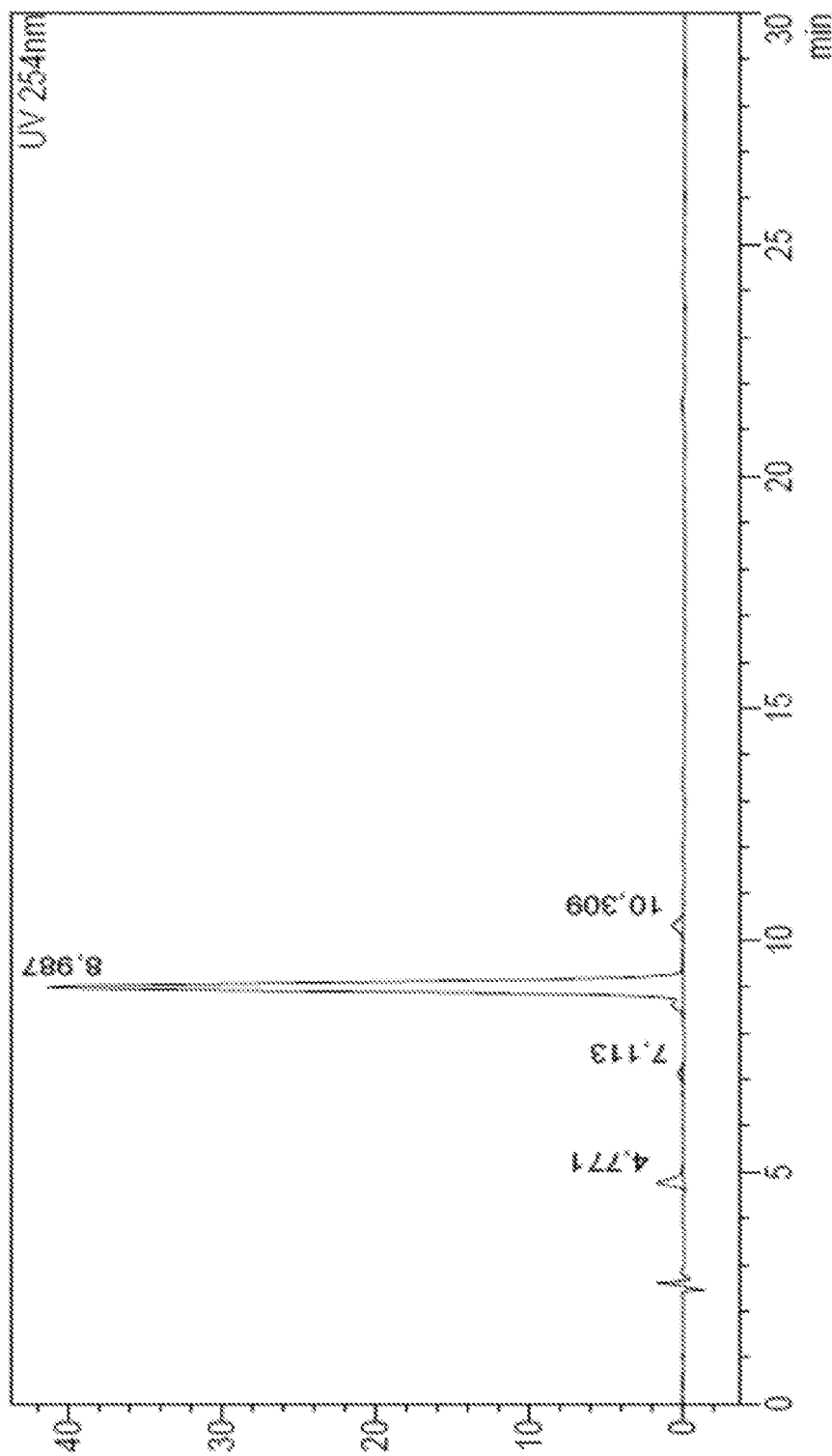
FIG. 6 is HPLC chromatogram of Example 3 (RT=8.987 min), UV at 254 nm using HPLC method 1.
Figure 7:
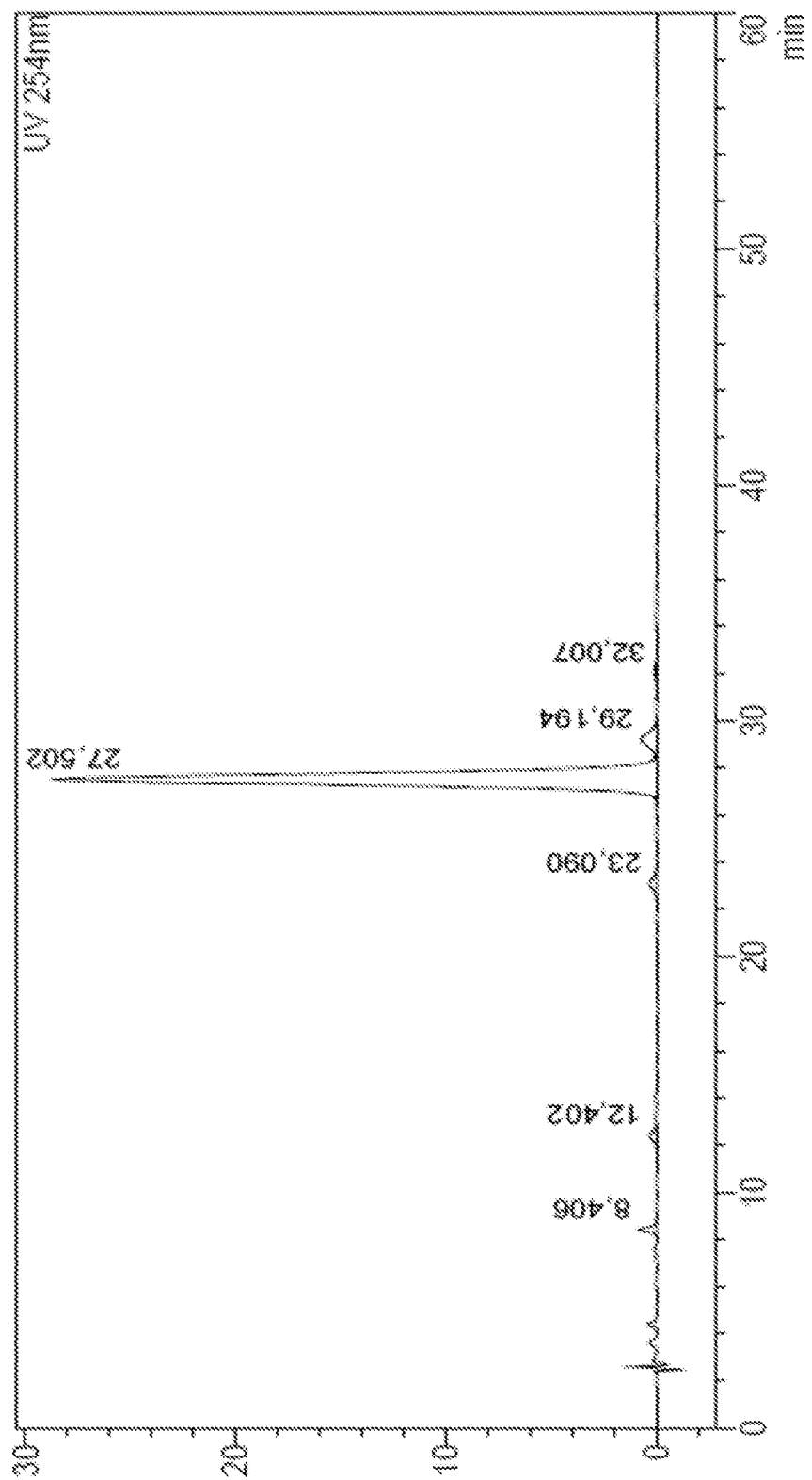
FIG. 7 is HPLC chromatogram of the precursor, Compound 8 (RT=27.502 min), UV at 254 nm using HPLC method 1.
Figure 8:
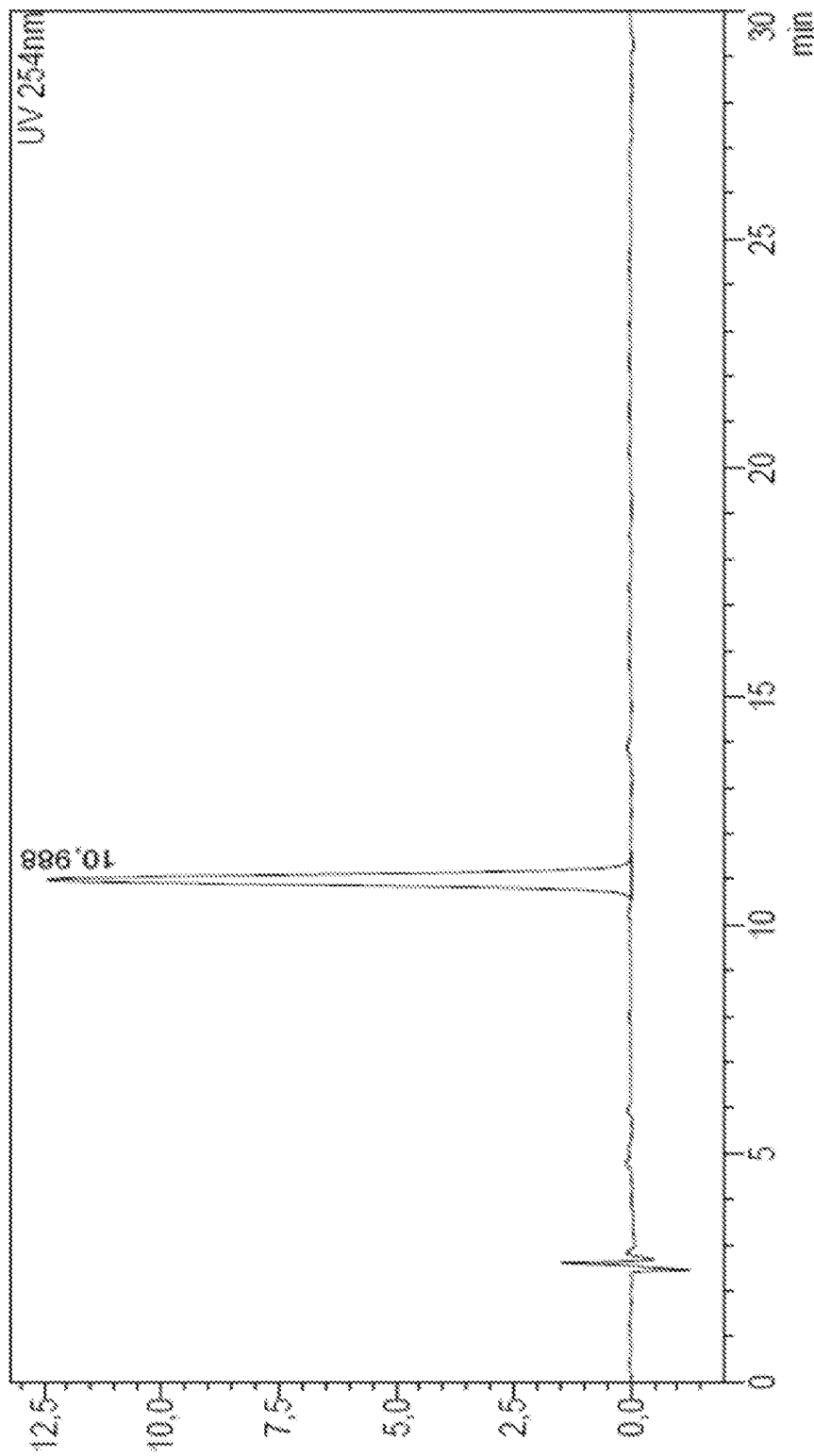
FIG. 8 is HPLC chromatogram of the diastereomer A of Example 3 (RT=10.988 min), UV at 254 nm using HPLC method 1.
Figure 9:
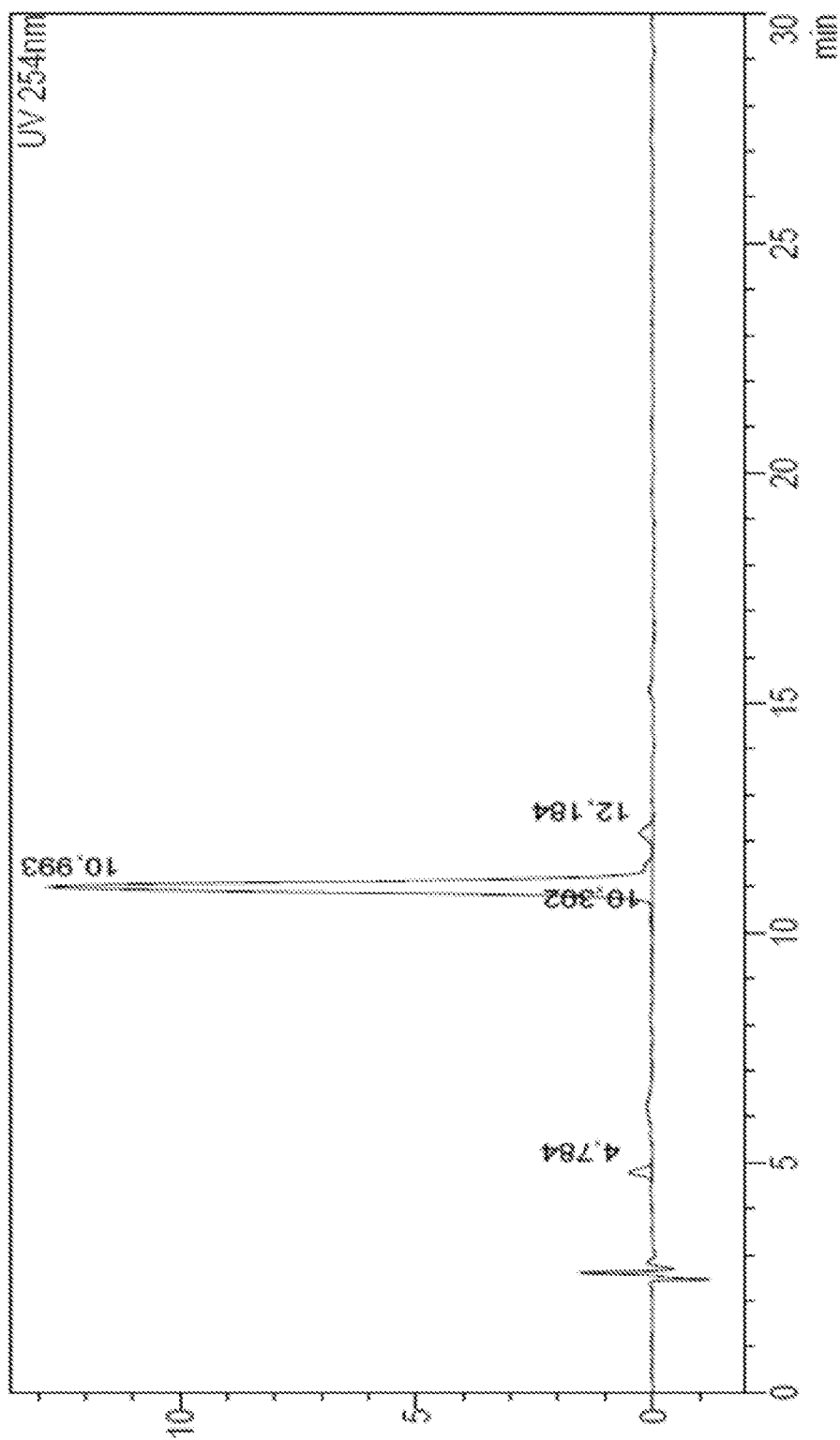
FIG. 9 is HPLC chromatogram of the diastereomer B of Example 3 (RT=10.993 min), UV at 254 nm using HPLC method 1.
Figure 10:
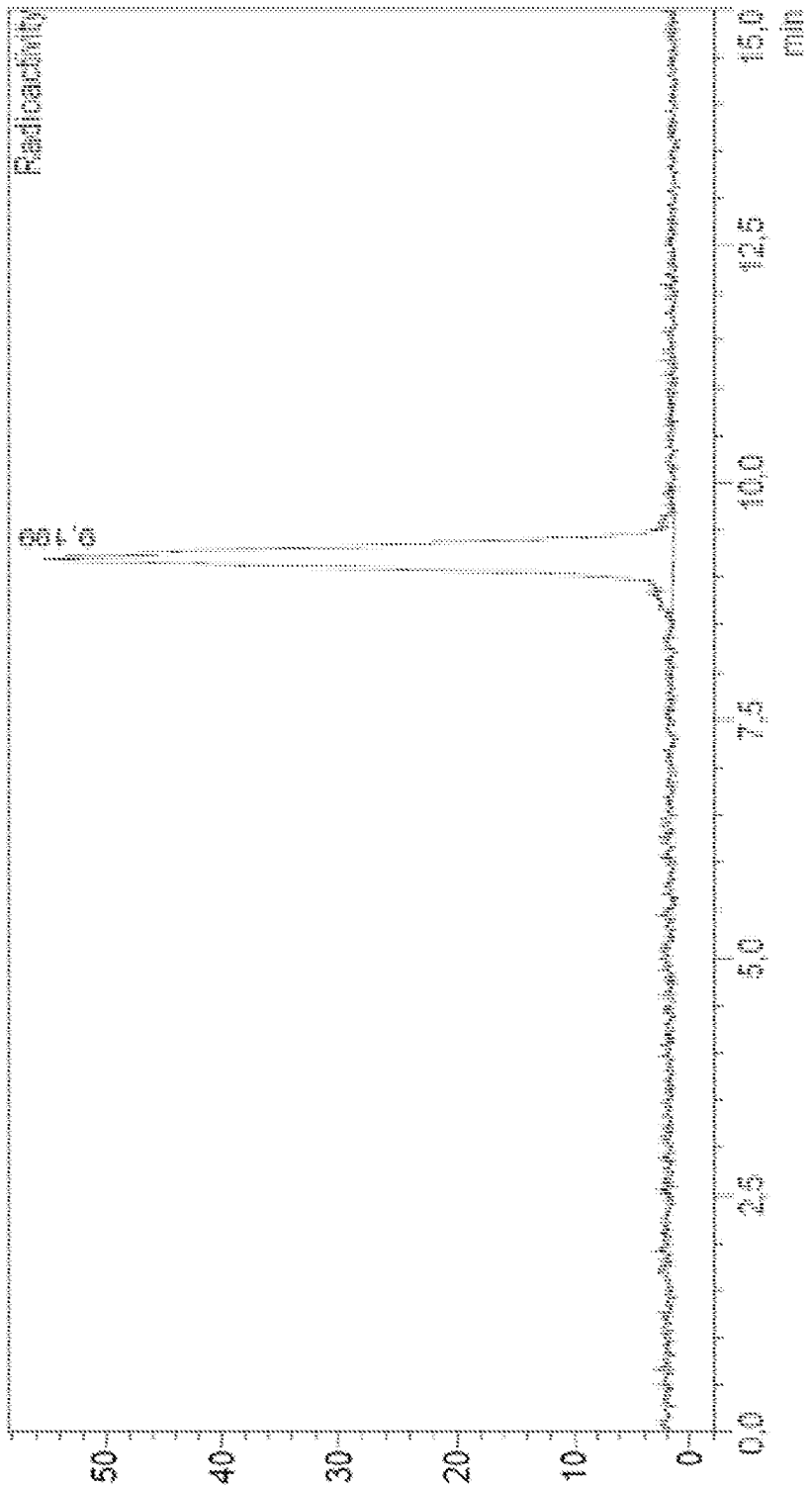
FIG. 10 is HPLC chromatogram of formulated [$^{18}$F] Example 3 (RT=9.199 min), using HPLC method 1.

Two analytical HPLC methods were established; one isocratic (HPLC method 1) and one gradient (HPLC method 2). HPLC method 1 was used to determine the A$_m$ of the tracer examples. The table 1 is conditions for HPLC method 1 and retention times for Example 1, Example 3 and isomers. The HPLC chromatograms (UV and radioactivity detection) were shown in FIG. 1-10.

TABLE 1

HPLC isocratic conditions and retention times for analytes

| Column | Altima C18 5 μm (250 × 4.6 mm) |
|---|---|
| Eluent | Isocratic; 40% MeCN in H$_2$O with (0.1%) |
| Flow rate | 1 ml/min |
| UV detection | 254 nm |
| Analytes | Retention time (min) |
| Example 1 | 9.504 |
| Precursor, Compound 5 | 29.876 |
| Diastereomer A of Example 1 | 11.690 |
| Diastereomer B of Example 1 | 11.684 |
| Example 3 | 8.987 |
| Precursor, Compound 8 | 27.502 |
| Diastereomer A of Example 3 | 10.988 |
| Diastereomer B of Example 3 | 10.993 |

Figure 11:
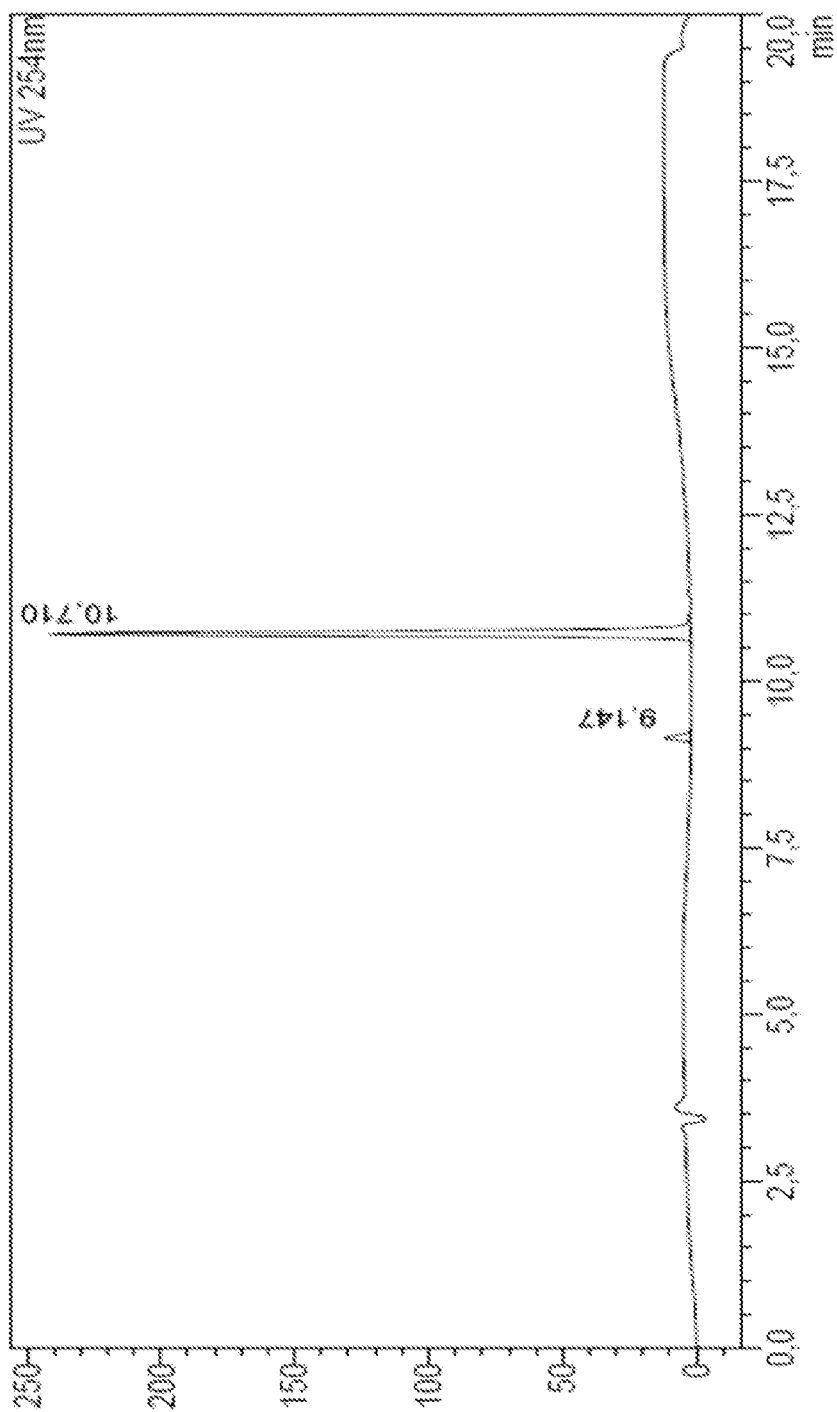
FIG. 11 is HPLC chromatogram of Example 1 (RT=10.710 min), UV at 254 nm using HPLC method 2.
Figure 12:
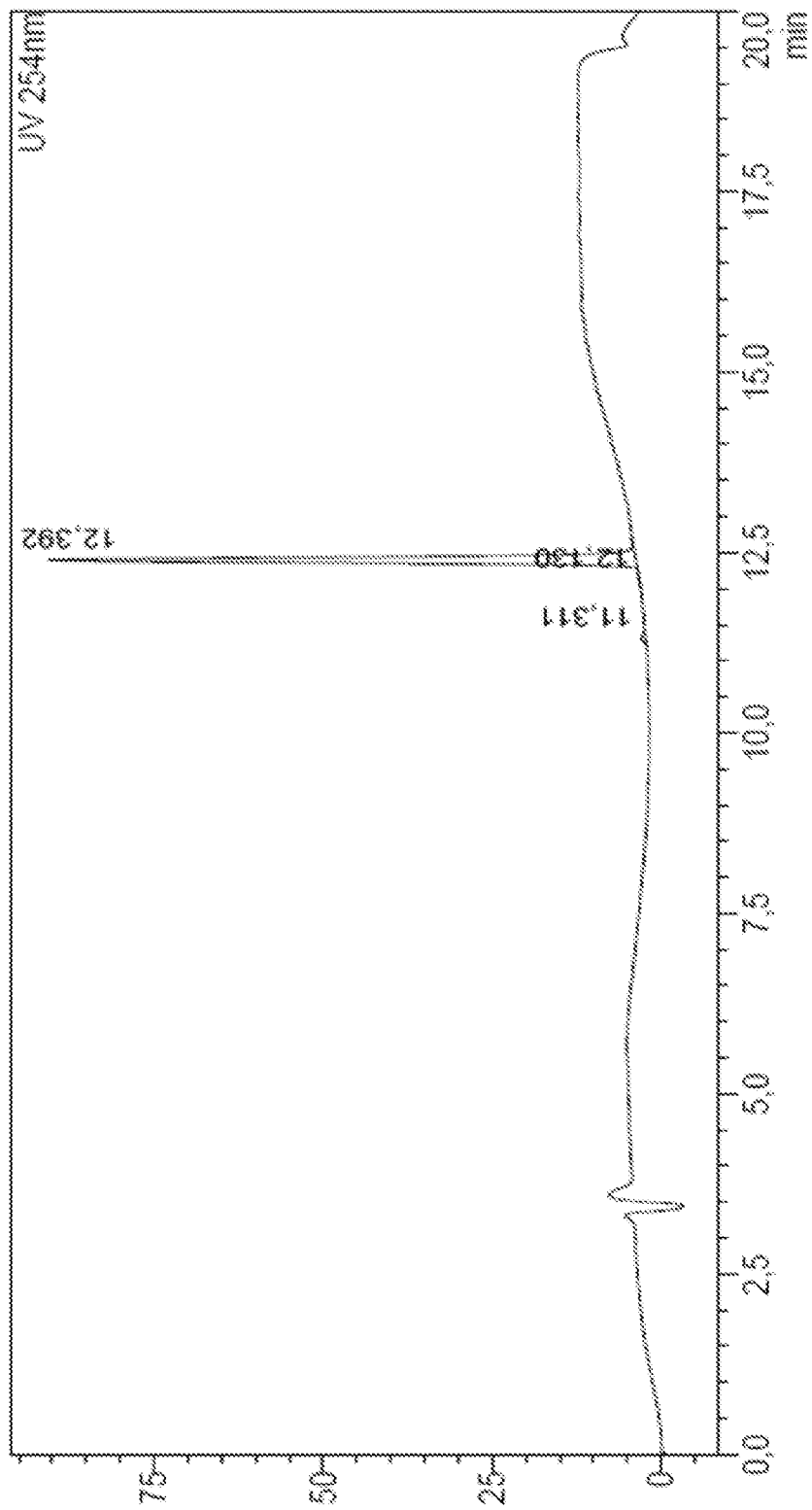
FIG. 12 is HPLC chromatogram of the precursor, Compound 5 (RT=12.392 min), UV at 254 nm using HPLC method 2.
Figure 13:
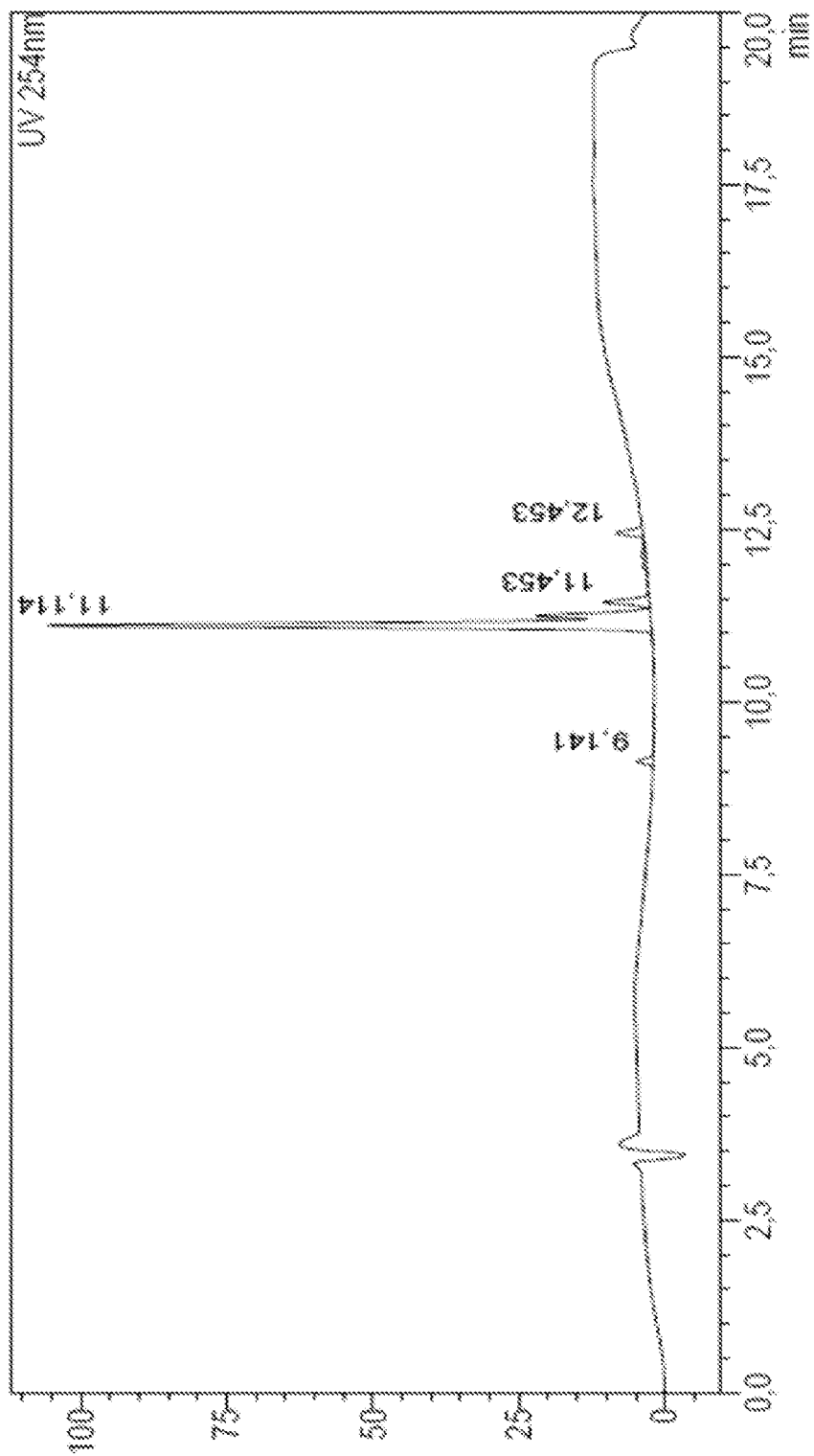
FIG. 13 is HPLC chromatogram of diastereomer A of Example 1 (RT=11.114 min), UV at 254 nm using HPLC method 2.
Figure 14:
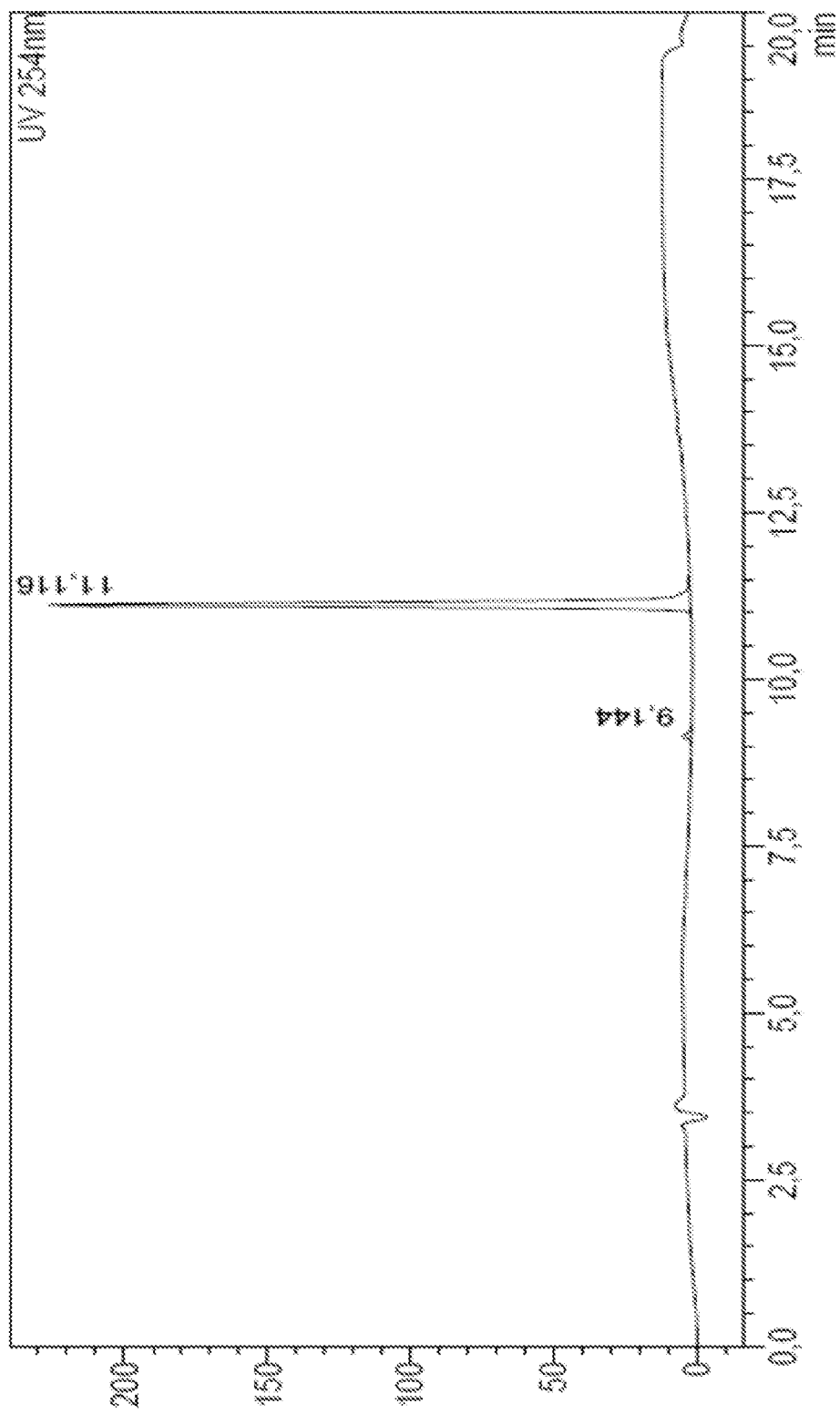
FIG. 14 is HPLC chromatogram of diastereomer B of Example 1 (RT=11.116 min), UV at 254 nm using HPLC method 2.
Figure 15:
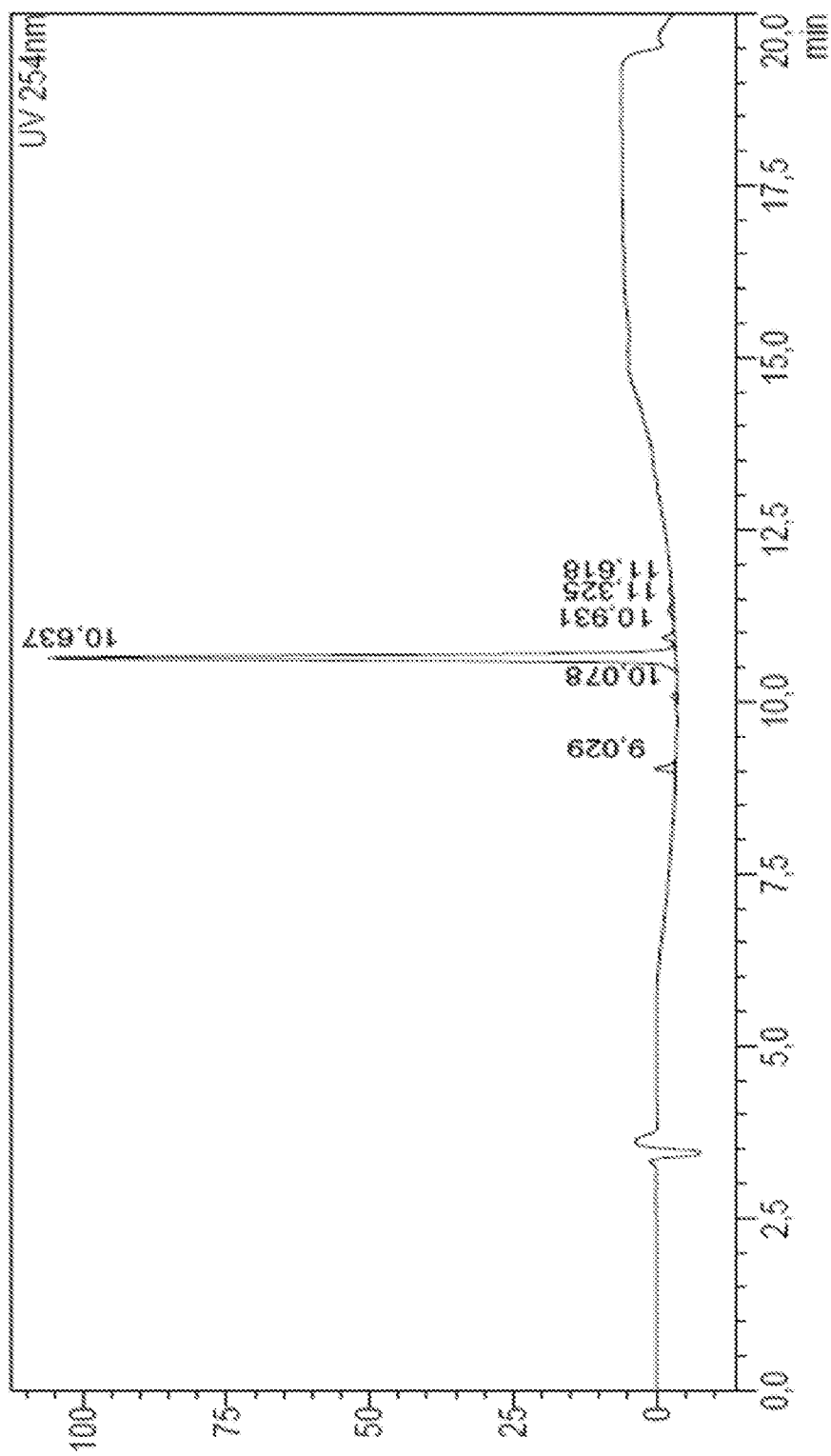
FIG. 15 is HPLC chromatogram of Example 3 (RT=10.637 min), UV at 254 nm using HPLC method 2.
Figure 16:
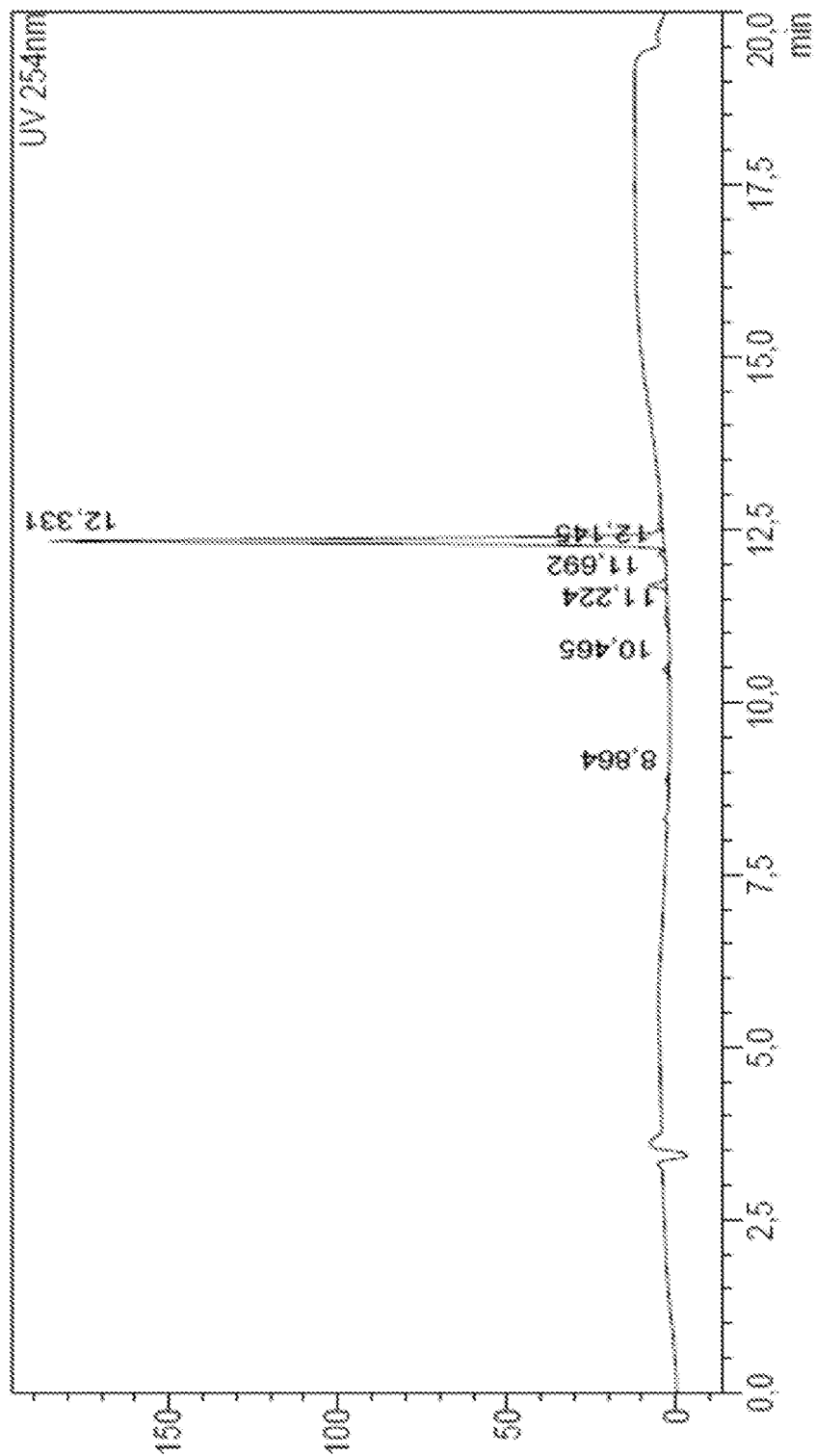
FIG. 16 is HPLC chromatogram of the precursor, Compound 8 (RT=12.331 min), UV at 254 nm using HPLC method 2.
Figure 17:
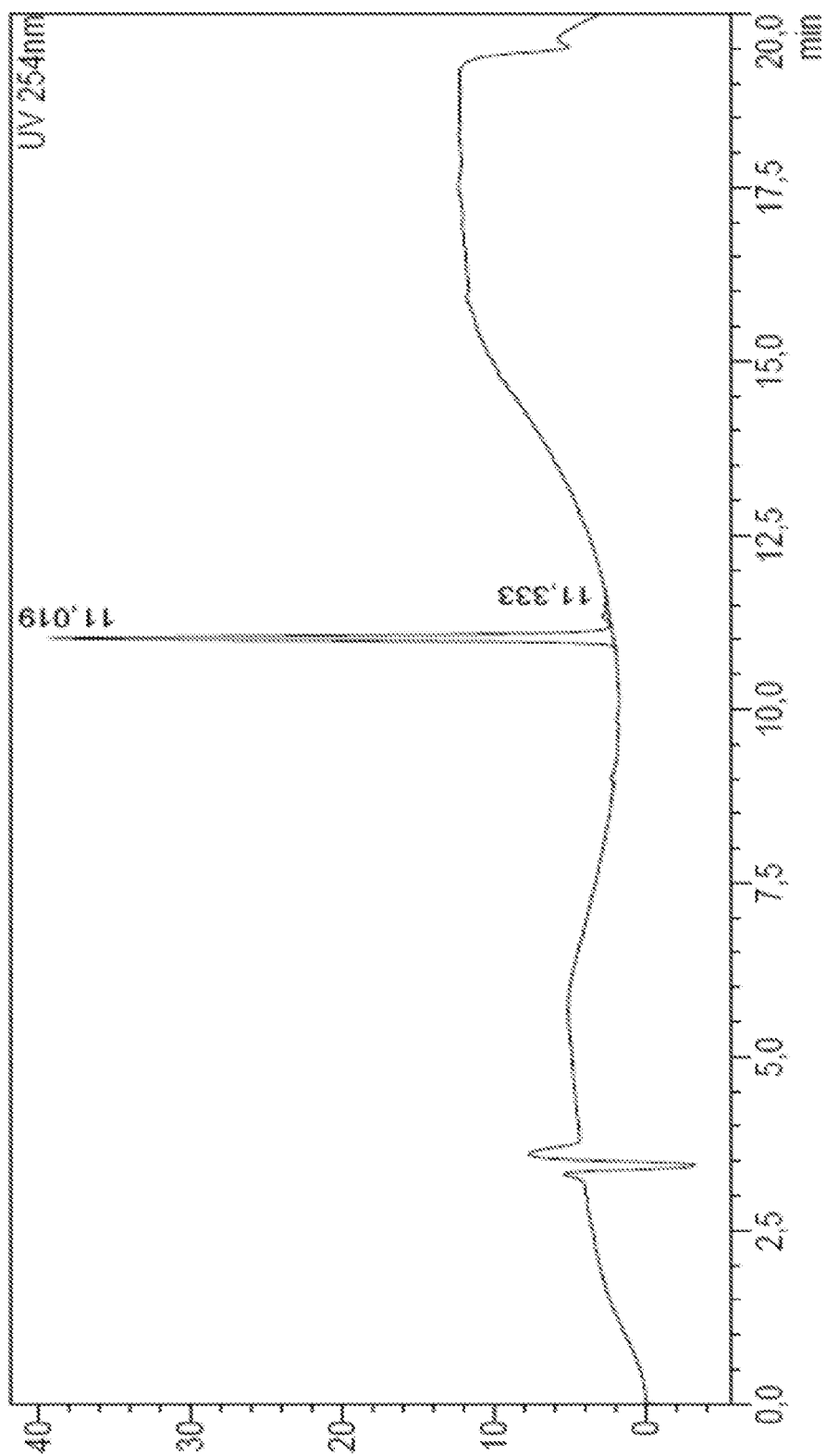
FIG. 17 is HPLC chromatogram of the diastereomer A of Example 3 (RT=11.019 min), UV at 254 nm using HPLC method 2.
Figure 18:
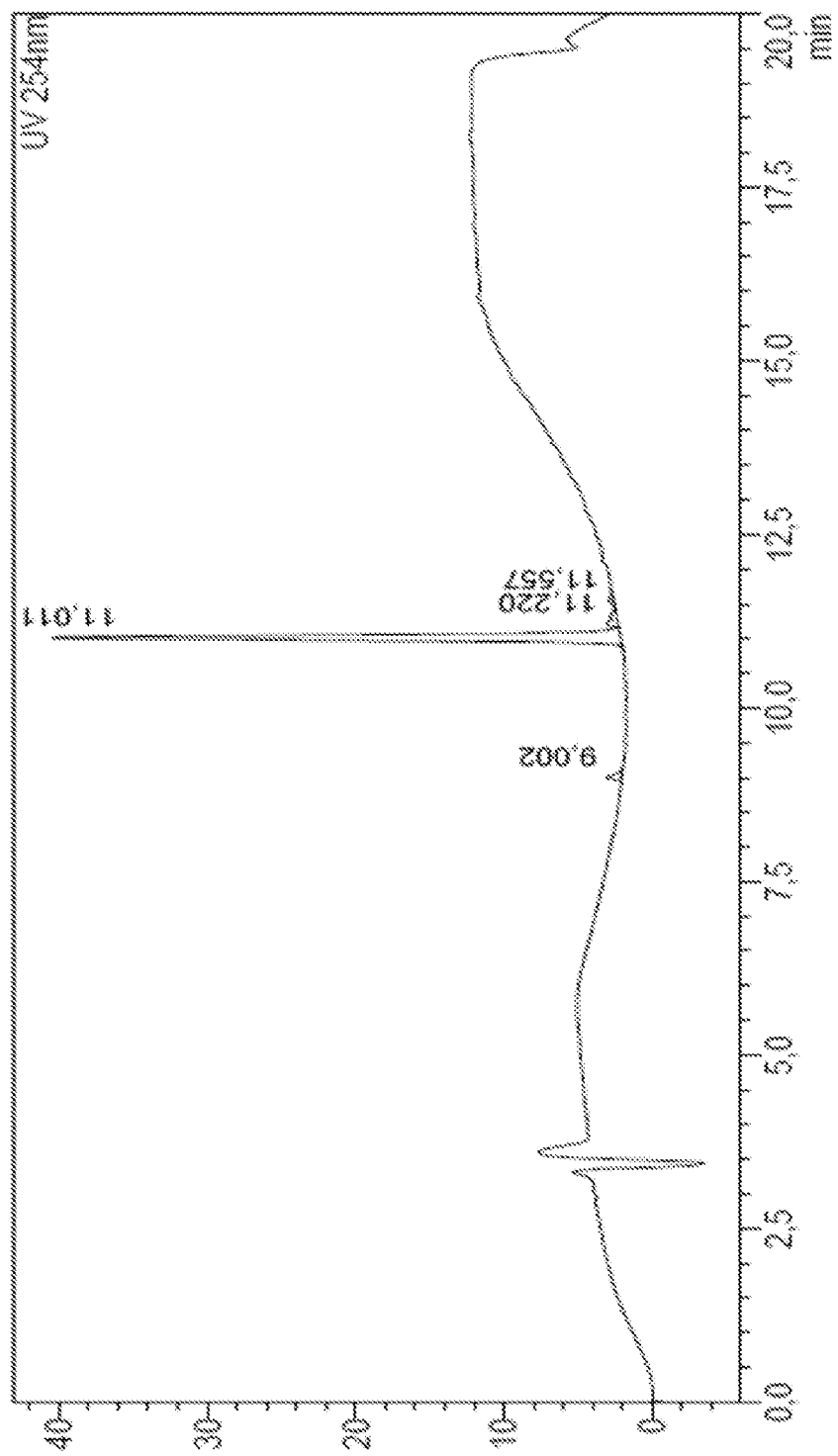
FIG. 18 is HPLC chromatogram of the diastereomer B of Example 3 (RT=11.011 min), UV at 254 nm using HPLC method 2.

The Table 2 is conditions for HPLC method 2 and retention times for Example 1, Example 3 and isomers. The HPLC chromatograms (UV and radioactivity detection) were shown in FIGS. 11-18.

TABLE 2

HPLC gradient conditions and retention times for analytes

| Column | Luna C18 5 μm (250 × 4.6 mm) | |
|---|---|---|
| Eluent | Gradient; 20-80% MeCN (0.1% TFA) in H$_2$O (0.1% TFA) | |
| Time (min) | MeCN (0.1% TFA) | H$_2$O (0.1% TFA) |
| 0-10 | 20 → 80 | 80 → 200 |
| 10-15 | 80 | 20 |
| 15-20 | 20 | 80 |
| Flow rate | 1 ml/min | |
| UV detection | 254 nm | |
| Analytes | Retention time (min) | |
| Example 1 | 10.710 | |
| Precursor, Compound 5 | 12.392 | |
| Diastereomer A of Example 1 | 11.114 | |
| Diastereomer B of Example 1 | 11.116 | |
| Example 3 | 10.637 | |
| Precursor, Compound 8 | 12.331 | |
| Diastereomer A of Example 3 | 11.019 | |
| Diastereomer B of Example 3 | 11.011 | |

What is claimed is:

1. A compound of Formula (I), or pharmaceutically acceptable salt thereof:

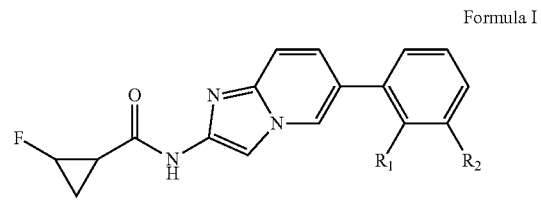

Formula I wherein

R$_1$ is —CH$_2$CH$_2$$^{18}$F or —OCH$_2$CH$_2$$^{18}$F when R$_2$ is —H, or

R$_1$ is —CH$_2$CH$_2$$^{18}$F or —OCH$_2$CH$_2$$^{18}$F when R$_2$ is —F.

2. The compound of claim 1, which is the compound of Formula (IIA) or a pharmaceutically acceptable salt thereof:

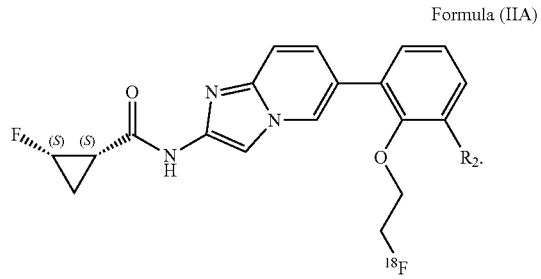

Formula (IIA)

wherein R$_2$ is —H or —F.

3. The compound of claim 1, which is the compound of formula (IIB) or a pharmaceutically acceptable salt thereof:

Formula (IIB)

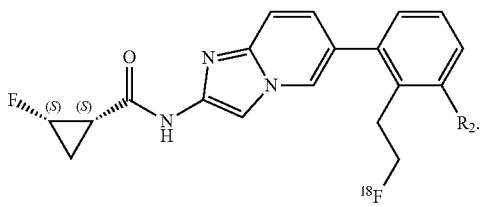

wherein R₂ is —H or —F.

4. The compound of claim 1 or a pharmaceutically acceptable salt thereof, which is selected from the group consisting of:
- (1S,2S)-2-fluoro-N-(6-(3-fluoro-2-(2-(fluoro-$^{18}$F)ethoxy)phenyl)imidazo[1,2-a]pyridin-2-yl)cyclopropane-1-carboxamide;
- (1S,2S)-2-fluoro-N-(6-(2-(2-(fluoro-$^{18}$F)ethoxy)phenyl)imidazo[1,2-a]pyridin-2-yl)cyclopropane-1-carboxamide;
- (1S,2S)-2-fluoro-N-(6-(2-(2-(fluoro-$^{18}$F)ethyl)phenyl)imidazo[1,2-a]pyridin-2-yl)cyclopropane-1-carboxamide; and
- (1S,2S)-2-fluoro-N-(6-(3-fluoro-2-(2-(fluoro-$^{18}$F)ethyl)phenyl)imidazo[1,2-a]pyridin-2-yl)cyclopropane-1-carboxamide.

5. A pharmaceutical composition comprising the compound of claim 1 or a pharmaceutically acceptable salt thereof, and a pharmaceutically acceptable carrier.

6. A method for positron emission tomography (PET) imaging, the method comprising:
applying the compound of claim 1 to a biological sample as a PET tracer; and
imaging the compound using PET.

7. The method of claim 6, wherein the biological sample is from an AD (Alzheimer's disease)-induced mouse AD model or an alpha-synuclein PFF (pre-formed fibril)-induced mouse PD (Parkinson's disease) model.

8. The method of claim 6, wherein the biological sample is from a patient with a neurodegenerative disease.

9. A method for positron emission tomography (PET) imaging, the method comprising:
administering the compound of claim 1 to a subject as a PET tracer, and imaging the compound using PET.

10. The method of claim 9, wherein the subject is an AD-induced mouse AD model or an alpha-synuclein PFF-induced mouse PD model.

11. The method of claim 9, wherein the subject is a patient with a neurodegenerative disease.

* * * * *